United States Patent
Letourneau et al.

(10) Patent No.: US 11,287,390 B1
(45) Date of Patent: Mar. 29, 2022

(54) SYSTEM AND METHOD FOR ELECTROMAGNETIC BEAMFORMING AND IMAGING AT LOW FREQUENCY

(71) Applicant: Reservoir Labs, Inc., New York, NY (US)

(72) Inventors: Pierre-David Letourneau, Long Island, NY (US); Mitchell Harris, New York, NY (US)

(73) Assignee: Reservoir Labs, Inc., New York, NY (US)

( * ) Notice: Subject to any disclaimer, the term of this patent is extended or adjusted under 35 U.S.C. 154(b) by 232 days.

(21) Appl. No.: 16/777,189

(22) Filed: Jan. 30, 2020

Related U.S. Application Data

(60) Provisional application No. 62/798,533, filed on Jan. 30, 2019.

(51) Int. Cl.

| | |
|---|---|
| *G01N 22/00* | (2006.01) |
| *G01N 27/22* | (2006.01) |
| *G01N 27/04* | (2006.01) |
| *G01N 27/72* | (2006.01) |
| *G01N 23/20* | (2018.01) |
| *G01N 23/00* | (2006.01) |
| *G01N 22/02* | (2006.01) |
| *G06T 11/00* | (2006.01) |
| *G01V 3/30* | (2006.01) |

(52) U.S. Cl.
CPC ............. *G01N 22/00* (2013.01); *G01N 23/00* (2013.01); *G01N 23/20* (2013.01); *G01N 27/04* (2013.01); *G01N 27/221* (2013.01); *G01N 27/72* (2013.01); *G01N 22/02* (2013.01); *G01N 27/22* (2013.01); *G01V 3/30* (2013.01); *G06T 11/003* (2013.01)

(58) Field of Classification Search
CPC ........ G01N 22/00; G01N 23/00; G01N 23/20; G01N 27/04; G01N 27/221; G01N 27/22; G06T 11/003; G01V 3/30
See application file for complete search history.

(56) References Cited

U.S. PATENT DOCUMENTS

| | | | | |
|---|---|---|---|---|
| 5,373,443 A | * | 12/1994 | Lee | ............ G01V 3/30 324/338 |
| 2016/0377557 A1 | * | 12/2016 | Kimura | ................ G06T 11/003 324/638 |

* cited by examiner

*Primary Examiner* — Amy He
(74) *Attorney, Agent, or Firm* — Goodwin Procter LLP

(57) ABSTRACT

A technique for measuring properties of a material includes measuring the electromagnetic radiation scattered by one or more scattering points associated with the material, and adjusting the radiation according to the respective sensitivities of the scattering points to changes in material properties at that scattering point for several pairs of radiation sources and receivers. The material properties are determined using the updated measurements and corresponding simulated measurements.

21 Claims, 13 Drawing Sheets
(13 of 13 Drawing Sheet(s) Filed in Color)

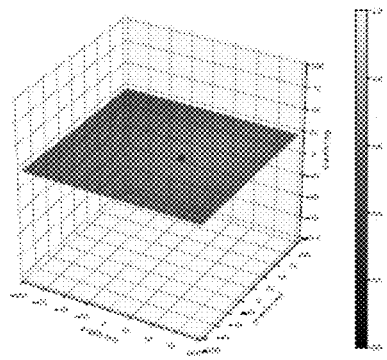
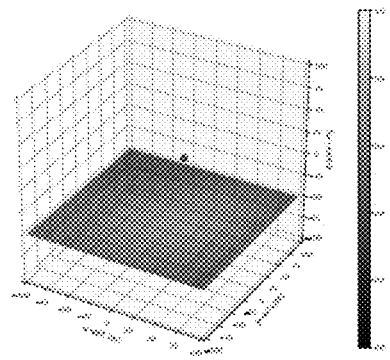
FIG. 6A  FIG. 6B
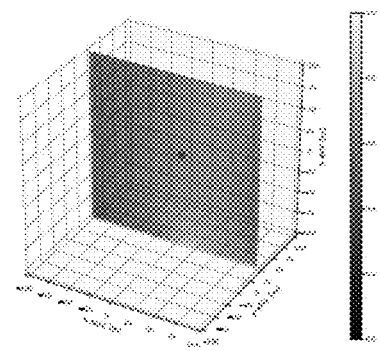
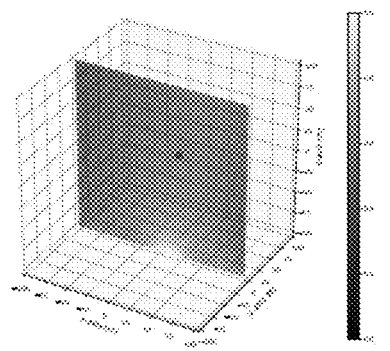
FIG. 6C  FIG. 6D
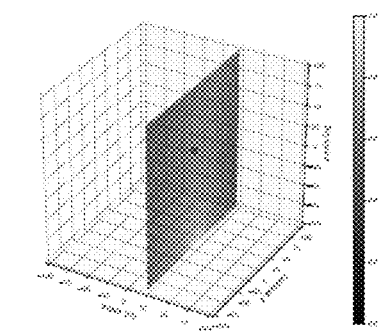
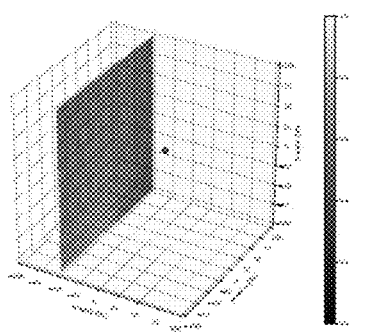
FIG. 6E  FIG. 6F

SYSTEM AND METHOD FOR ELECTROMAGNETIC BEAMFORMING AND IMAGING AT LOW FREQUENCY

CROSS-REFERENCE TO RELATED APPLICATIONS

This application claims priority to and benefit of U.S. Provisional Patent Application No. 62/798,533, entitled "System and Method for Electromagnetic Beamforming and Imaging at Low Frequency," filed on Jan. 30, 2019, the entire contents of which are incorporated herein by reference.

GOVERNMENT LICENSE RIGHTS

This invention was made with government support under contract No. HR001118C0048 awarded by the U.S. Department of Defense (DoD). The government has certain rights in the invention.

FIELD OF THE INVENTION

This disclosure generally relates to sensors employing electromagnetic radiation and, in particular, to sensors for three-dimensional (3D) imaging of material properties.

BACKGROUND

Imaging through conductive structures embedded in a dielectric medium, such as air/sea water or air/metal containers, using electromagnetic (EM) waves is generally considered a difficult problem. Imaging in this context may be understood as determining one or more properties of the conducive structure/material, such as permittivity ($\epsilon$), conductivity ($\sigma$) and permeability ($\mu$). On one hand, existing high-frequency techniques are theoretically well-understood, provide resolution guarantees and can be used in combination with efficient algorithms. On the other hand, high-frequency methods cannot be employed in this context because high-frequency waves do not penetrate deeply enough within conductive structures to produce a signal containing sufficient information for imaging purposes.

Low-frequency waves, on the other hand, have a much superior penetrating power. Further, they can propagate through dielectric media, which is a feat not achievable by DC signals (frequency $\omega$=0), as they are limited to purely conductive material. There are three commonly-employed low-frequency electromagnetic imaging methods: (1) Electrical Impedance Tomography (EIT) (a.k.a. Electrical Resistance Tomography (ERT); (2) Electrical Capacitance Tomography (ECT); and (3) Magnetic Induction Tomography (MIT) (a.k.a. Mutual Inductance Tomography, or Electromagnetic Tomography. Unfortunately, existing low-frequency techniques exhibit low resolution and incur such a high computational cost that they are of little practical use.

SUMMARY

In various embodiments, we present a novel scheme for performing imaging that may use low-frequency electromagnetic waves. As used herein, a low-frequency wave has a wavelength larger than (typically orders-of-magnitude larger than) the size of the imaging domain. Such waves can be generated using portable sources (See, e.g., M. A. Kemp, et al., "A high Q Piezoelectric Resonator as a Portable VLF Transmitter," *Nature communications*, 10(1):1715, 2019). The scheme is not limited to the use of low-frequency waves only, however, and employs a novel filtering scheme (Section 1.4). The overall scheme can be applied at practical scales using a fast algorithm that we describe for simulating electromagnetic signals in complex media. Our scheme can achieve significantly higher resolution than existing low-frequency techniques. It also possesses higher imaging capabilities than high-frequency methods in media involving conductive materials and is highly versatile.

In various embodiments, high resolution imaging can be achieved, at least in part by using a number of electromagnetic radiation sources and receivers. One source is activated at a time and directs radiation to a region to be imaged. The region may be homogeneous, i.e., the region may include substantially the same type of material, or inhomogeneous, i.e., the region may include different materials having substantially different properties. As used herein, "substantially similar" generally means that the variation in a material property is less than 20%, 10%, 5%, 2%, 0.5%, etc. The region may include one or more scattering points (also called steering points). Radiation scattered by these scattering point(s) is received and measured at several receivers.

A respective sensitivity weight vector is associated with each scattering point, where the sensitivity weight vector designates to each source-receiver pair a relative importance indicative of sensitivity of the pair to a change in one or more material properties at that scattering point. The measured radiation is modified using the sensitivity weigh vector which, in effect, results in filtering the measured radiation corresponding to each scattering point according to the sensitivity of that scattering point to different pairs of sources and receivers. Rastering is then performed, which is an aggregation of radiation measurements for the different scattering points, where each measurement is modified or weighted according to the respective sensitivity weight vectors of different scattering points. This allows focusing, for each scattering point, on measurements from those source-receiver pairs that contribute more effectively to the scattering of radiation and, in turn, determination of material properties, at that scattering point.

The overall scheme also involves computing, by simulation, forward electromagnetic fields at the scattering points and back-projecting the updated radiation measurements to determine backprojected electromagnetic fields at the scattering point(s). An adjoint linearized residual operator may be applied to the forward and backprojected electromagnetic fields to determine material properties or a change therein at respective scattering points. In effect, this process guesses the value(s) of material properties at the scattering point(s) and determines what the electromagnetic field values at the scattering point(s) would be for the guessed values. If the determined electromagnetic field values match, e.g., in a minimized least-square error sense, with the measured values, filtered and rasterized, the guessed material property value(s) represent the actual material property value(s) at the scattering points.

Accordingly, in one aspect, a method is provided for determining one or more physical properties of material. The method includes activating a number of electromagnetic radiation sources one at a time, to direct electromagnetic radiation to an imaging region. The imaging region includes material having one or more scattering points at each of which one or more physical properties of the material are to be determined. The method also includes measuring, at a plurality of receivers, electromagnetic radiation scattered by the one or more scattering points.

The method further includes, for each scattering point, updating the measured radiation (denoted $[d_j]_n$), when "j" indicates the j-th source and "n" indicates the n-th receiver), according to a respective sensitivity weight vector ($f_l$, where "l" indicates the l-th scattering point) of that scattering point. The sensitivity weight vector designats for each source-receiver pair a relative importance indicative of sensitivity of the pair to a change in one or more material properties at the scattering point. The method further includes computing the one or more physical properties at each scattering point using the updated (e.g., filtered and rasterized) radiation measurement (denoted $\tilde{d}$).

In some embodiments, computing the one or more physical properties at a particular scattering point includes computing forward electromagnetic fields (denoted $E_j(s)$ and $H_j(s)$) by applying a forward Maxwell operator to a dipole moment (denoted ($m_j$, E) for electric or ($m_j$, H) for magnetic of each source. This may involve solving Eq. (14), as discussed below. The computation also includes computing backprojected electromagnetic fields (denoted $\varepsilon_j(s)$ and $\mathcal{H}_j(s)$), by applying an adjoint operator to the updated radiation measurement, which may involve solving Eq. (15), as discussed below. The computation of the one or more physical properties at a particular scattering point also includes computing an adjoint of a linearized residual operator using the forward and backprojected electromagnetic fields, which may involve solving Eq. (17), as discussed below.

In some embodiments, the sensitivity weight vector ($f_l$) for a particular scattering point is based on one or more sensitivity parameters. A particular sensitivity parameter (denoted $\phi_{j,n}^{p,q}$ (E, x) or $\phi_{j,n}^{p,q}$ (H, x)) represents, for a particular source-receiver pair (denoted $s_j$, $d_n$), a magnitude of change in one dimension (p) of a three-dimensional space (where dimension $p \in \{x, y, z\}$), in electric or magnetic field measured at the particular receiver (denoted $d_n$) in response to change in a property of material (denoted $\{a\}$ and/or $\{b\}$) at the scattering point (denoted "x") in the same or another dimension (denoted $q \in \{x, y, z\}$) of the three-dimensional space.

In some embodiments, the method further includes determining the sensitivity weight vector ($f_l$) of a scattering point. The determination of the sensitivity weight vector may include determining a first set of sensitivity parameters (represented as matrix $\mathcal{A}$) for the scattering point (referred to as a "good" scattering point), and determining a second set of sensitivity parameters (represented as matrix $\mathcal{B}$) for one or more different scattering points (referred to as "bad" scattering points). The method further includes computing a sensitivity weight vector that maximizes a ratio of a first norm based on the first set of sensitivity parameters and a second norm based on the second sect of sensitivity parameters, which may involve computing Eq. (39), as discussed below.

In some embodiments, computing a particular sensitivity parameter for a particular scattering point includes computing forward electromagnetic fields by applying a forward Maxwell operator to a dipole moment of each source from the several sources, which may involve computing Eq. (14), as discussed below. The computation also includes computing backprojected electromagnetic fields by applying an adjoint operator to the forward electromagnetic fields, which may involve computing Eq. (15), but using the forward electromagnetic fields and not the measured radiation or the measured radiation as updated). Thereafter, a sensitivity parameter may be computed using the forward and backprojected electromagnetic fields, which may involve computing Eqns. (23) and (24), as discussed below.

An electromagnetic radiation source among the several sources may be an electric dipole or a magnetic dipole. In some embodiments, a wavelength of radiation from an electromagnetic radiation source among the various sources used is larger than a size of the imaging region. In this case, the radiation from that source is designated a low-frequency radiation. Such an electromagnetic radiation source may be a piezoelectric resonator. A physical property of the material may include one or more of permittivity, conductivity, or permeability. The material may be homogeneous or inhomogeneous.

In another aspect, a system is provided for determining one or more physical properties of material. The system includes a first processor, and a first memory in electrical communication with the first processor, where the first memory includes instructions that may be executed by a processing unit that may include the first processor or a second processor, and that is in electronic communication with a memory module that may include the first memory or a second memory.

The instructions program the processing unit to: receive from a subsystem that includes several electromagnetic radiation sources and several receivers, where the several sources are configured for directing electromagnetic radiation to an imaging region that includes material having one or more scattering points at each of which one or more physical properties of the material are to be determined, electromagnetic radiation scattered by the one or more scattering points. The instructions also program the processing unit to, for each scattering point, update the measured radiation according to a respective sensitivity weight vector of that scattering point. The sensitivity weight vector designates for each source-receiver pair a relative importance indicative of sensitivity of the pair to a change in one or more material properties at the scattering point.

Moreover, the instructions program the processing unit to compute the one or more physical properties at each scattering point using the updated radiation measurement. In various embodiments, the instructions can program the processing unit to perform one or more of the method steps described above.

In some embodiments, the system includes the subsystem that includes the several electromagnetic radiation sources and the several receivers. An electromagnetic source among the several sources may be an electric dipole or a magnetic dipole. Alternatively, or in addition, an electromagnetic source among the several sources may be a piezoelectric resonator. A wavelength of radiation from an electromagnetic radiation source in the plurality of sources may be larger than a size of the imaging region.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the invention. In the drawings:

FIGS. 6A-6F show cross-sectional (2D) views of the (3D) image reconstructed using output least-squares with Tikhonov regularization;

DETAILED DESCRIPTION

Figure 1:
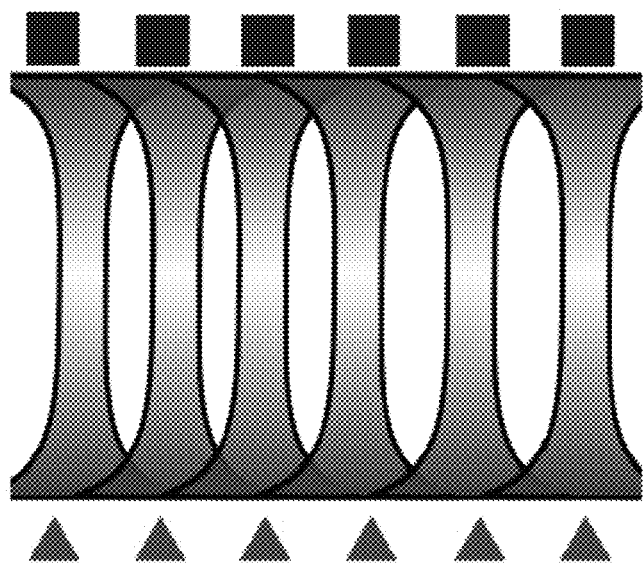
FIG. 1 schematically depicts example low-frequency sensitivity functions between combinations of sources and receivers, in a homogeneous medium located in-between the sources and the receivers.

This disclosure is structured as follows: Section 1 describes some existing techniques and gives an overview of our technique, including differences between our techniques and various existing techniques, and summarizes our contributions. Section 2 details the physical model as well as the theoretical tools underlying the imaging technique. Section 3 provides information about the fast algorithm used to perform physical simulations. The imaging algorithm specifics can be found in Section 4, and extensive numerical results are presented in Section 5.

1. Low-Frequency Measurement and Image Reconstruction Techniques

The low-frequency technique EIT (Section 1.1.1) is essentially a zero-frequency approximation ($\omega=0$) that uses potentials and direct current injections to recover the conductivity ($\sigma$). ECT, discussed in Section 1.1.2, is designed to recover permittivity ($\epsilon$) distributions in insulating materials through capacitance measurements. Finally, MIT (Section 1.1.3) is based on a low-frequency ($\omega \approx 0$) approximation that uses alternating currents and field measurements to produce an image of low-permittivity materials. Under appropriate circumstances, e.g., when the skin depth of an inclusion is comparable to its characteristic size, it has the ability to identify both permeability ($\mu$) and conductivity ($\sigma$) perturbations. We provide further details regarding each technique below.

1.1 Physical Modeling and Low-Frequency Imaging Techniques

We now describe the most common low-frequency imaging techniques, as well as their advantages and their limitations.

1.1.1. Electrical Impedance Tomography (EIT)

EIT is used to recover an unknown conductivity distribution $\sigma(x)$ from boundary measurements. The governing system of equations of EIT under the Complete Electrode Model (CEM) takes the following form:

$$-\nabla \cdot (\sigma(x) \nabla u(x)) = 0, \quad x \in \Omega \tag{1}$$

$$\int_{e_k} \sigma \frac{\partial u}{\partial \hat{n}} ds = I_k, \quad k = 1, \ldots, K$$

$$\sigma(x) \frac{\partial u}{\partial \hat{n}}(x) = 0, \quad \forall x \in \partial \Omega \setminus \bigcup_{k=1}^{K} e_k$$

$$u(x) + z_k \sigma(x) \frac{\partial u}{\partial \hat{n}}(x) = V_k, \quad \forall x \in e_k, k = 1, \ldots, K,$$

where $\Omega \in \mathbb{R}^d$ (d=2.3) is an open domain with Lipschitz boundary $\partial \Omega$, $\hat{n}$ is the unit normal vector on $\partial \Omega$, $\sigma(x)$ is the conductivity distribution to be recovered, $\{e_k\}$ are boundary sets representing the location area of electrodes, $u(x)$ is the electric potential, $\{z_k\}$ are contact impedances, $\{V_k\}$ are known applied potentials at the boundary and $\{I_k\}$ are known currents applied at the boundary. The solution map from boundary potentials to currents on the boundary is generally referred to as the Dirichlet-to-Neumann map (DtN), whereas the map from currents to potentials is called Neumann-to-Dirichlet map (NtD). The Partial Differential Equations (PDE) system is of an elliptic nature and can be derived under a quasi-static assumption on the electromagnetic process. In particular, EIT is restricted by the fact that the medium under consideration must be conductive. In this sense, it applies to fields such as medical imaging, nondestructive testing and geophysical prospecting but leaves out applications such as target localization in air or underwater imaging in the presence of an air/water interface. EIT has been extensively studied theoretically and numerically.

1.1.2 Electrical Capacitance Tomography (ECT)

ECT is a method used to recover a permittivity distribution $\epsilon(x)$ within an insulator. It is mathematically similar to EIT, with governing system of PDEs given by $$-\nabla \cdot (\epsilon(x) \nabla u(x)) = 0, \quad x \in \Omega \tag{2}$$

$$\int_{e_k} \epsilon \frac{\partial u}{\partial \hat{n}} s = Q_k, \quad k = 1, \ldots, K$$

$$u(x) = 0, \quad \forall x \in \partial \Omega \setminus \bigcup_{k=1}^{K} e_k$$

$$u(x) = V_k, \quad \forall x \in e_k, k = 1, \ldots, K,$$

where $\Omega \in \mathbb{R}^d$ (d=2.3) is, again, an open domain with Lipschitz boundary $\partial\Omega$, $\epsilon(x)$ is the permittivity distribution to be recovered, $\{e_k\}$ are boundary sets representing the location area of electrodes (sources/receivers), u(x) is the electric potential, $\{V_k\}$ are known applied potentials at the boundary and $\{Q_k\}$ are the total electric charges on the portions $\{e_k\}$ of the boundary. The PDE system is elliptic like that of EIT. In the absence of a charge density, it can be derived from Maxwell's equations under the assumption that the medium is non-conducting ($\sigma$=0) and of sufficiently low permeability relative to the frequency being used ($\omega\mu\approx 0$).

1.1.3 Magnetic Induction Tomography (MIT)

MIT relies on the following PDE system, sometimes referred to as the eddy current equations:

$$\nabla \times E(x) = i\omega\mu(x)H(x), x \in \mathbb{R}^3 \quad (3)$$

$$\nabla \times H(x) = \sigma(x)E(x) + J(x), x \in \mathbb{R}^3 \quad (4)$$

$$E(x) = O(|x|^{-1}), H(x) = O(|x|^{-1}), |x| \to \infty, \quad (5)$$

where E(x) is the electric field, H(x) is the magnetic field, J(x) are external electric currents, $\sigma(x)$ is a conductivity distribution, $\mu(x)$ is a permeability distribution and $\omega$ is the working angular frequency (time-harmonic). This system of PDEs is of a diffusive nature. It can be obtained as a first-order approximation of Maxwell's equations at low-frequency (Eq. 2), or under an assumption of low permittivity relative to frequency ($\omega\epsilon \ll 1$). It uses low-frequency alternating magnetic fields to probe the medium. MIT has found applications in both the industrial and the biomedical fields. One practical advantage of MIT is that it does not require direct contact with the medium (as opposed to EIT where such contact leads to impedance). Further, it is sensitive to both the permeability ($\mu$) and the conductivity ($\sigma$) of the medium.

Our overall technique employed in various embodiments described below do not make any such modeling assumptions or approximations. Rather, our methodology is based on solutions of the complete system of Maxwell's equations (Eq. (7)), and thus it can capture all possible phenomena, can treat complex materials, and can recover permittivity ($\epsilon$), conductivity ($\sigma$) and permeability ($\mu$) perturbations. Such considerations of the full electromagnetic wave propagation problem is of prime importance, especially in biomedical applications.

1.2 Image Reconstruction Techniques and Algorithms

Despite different underlying models, the aforementioned imaging methods make use of similar image reconstruction techniques. Here, we provide a brief description of the most commonly-used algorithms:

Output least-squares is by far the most commonly-employed technique. It relies on an optimization problem of the form: $\min_{\delta\sigma} \|F(\sigma) \delta\sigma - g\|_2^2 + P(\delta\sigma)$, where F is the forward modeling operator, $\delta\sigma$ is the quantity to be imaged, g is the measured data, and $P(\cdot)$ is a regularizing term. There are various possible choices for $P(\cdot)$. Examples include: 1) $P(\delta\sigma) = \|\delta\sigma\|_2^2$ which can overcome under-determiness but leads to resolution loss, 2) $P(\delta\sigma) = \|\delta\sigma\|_1$ which promotes sparsity in the image, and 3) $P(\delta\sigma) = \|\delta\sigma\|_{TV}$ (Total variation) which promotes sparsity and sharp edges in the image. Output least-squares methods are computationally advantageous thanks to the existence of efficient algorithms for the application of the various operators involved. Their main drawback is associated with the nonlinear nature of the inverse problem that can lead descent schemes towards erroneous images (local minimum).

While the technique presented in various embodiments below relate to this category. However, the regularization technique (described below in the context of filtering, Section 4) employed is entirely different from those listed above.

Variational methods (EIT & ECT only) are based on variational principles. They represent powerful tools for the theoretical study of the EIT and ECT problems. However, from a numerical standpoint, their direct application for image reconstruction has proved elusive, either due to ill-conditioning, lack of regularity or lack of uniqueness. Nonetheless, using variational principles-like equations as constraints on optimization-based inversion scheme has shown promises.

Bayesian inversion methods attempt to recover the posterior distribution of some material properties given the data g, i.e., $$\mathbb{P}(\sigma|g) = \frac{\mathbb{P}(g|\sigma)\mathbb{P}(\sigma)}{\mathbb{P}(g)}.$$

To do so, a forward and measurement noise models are used, together with a (user-provided) prior distribution. Once a posterior distribution of the properties has been constructed, its mean is generally taken as the solution of the inverse problem. Theoretical correctness and stability of the Bayesian inverse problem have recently been studied. Bayesian inverse method are both versatile and well-suited for uncertainty quantification. However, they are also computationally expensive, requiring a very large number of simulations in order to reach convergence. Further, the inversion process can be highly sensitive to the choice of prior distribution.

Monoticity-based methods (EIT & ECT only) take their name from the fact that if $\sigma(x)$ and $\tau(x)$ are two conductivity distributions and if $\Lambda_{NtD}(\cdot)$ represents the Neumann-to-Dirichlet map [26], then: $\sigma(x) \leq \tau(x) \Rightarrow \Lambda_{NtD}(\sigma) \geq \Lambda_{NtD}(\tau)$. To proceed to the inversion, one visits every voxel in the image, perturbs it, solves the perturbed problem and verifies whether $\Lambda_{NtD}(\sigma) \geq \Lambda_{NtD}(\tau)$, thus establishing whether the current voxels overlaps with a region of higher conductivity. If so, the voxel is "included in the image". Otherwise, one moves to the next voxel. One advantage of such methods is that they do not require the linearization of the NtD map. This avoids issues associated with local minima as encountered with least-squares methods. However, such techniques are very computationally intensive; each voxel in the imaging domain requires a numerical simulation plus an eigenvalue estimation. Further, the method does not provide information about the contrast between the background and the perturbation.

1.3 Filtering and Image Reconstruction

The idea of using filtering to improve image reconstruction in the context of high-frequency wave-based (e.g., acoustic) imaging has been explored in the past. For instance, some researchers have proposed methods to produce filter/signals such that, when applied at the transducer array, will generate a predetermined pattern (generally a well-localized function) on a focal/control plane. The goal of these techniques is to use a pattern that exhibits better spatio-temporal focusing than traditional techniques (e.g., time-reversal) in complex environments such as reflective, reverberating and absorbing media. The methods are designed for high-frequency, high-bandwidth signals, are all Singular Value Decomposition (SVD)-based and produce an "optimal" filter in the least-squares sense.

In some reports, the method has been shown only to marginally improve focusing experimentally in the limited case of a linear transducer array and linear control plane in a homogeneous medium and, in the case of an inhomogeneous medium, some improvements under various experimental scenarios of practical interest. The main drawback of the latter technique for the treatment of inhomogeneous media is the necessity to know the whole "transfer matrix" (Green's function). This requires either significant apriori knowledge of the medium, or invasive measurements.

Another, less invasive method requires only the knowledge of the Green's function between each transducer array element and between the focus point and the transducer array elements in a lossless medium. We note, however, that all the aforementioned methods have a goal of focusing energy at a particular point within an inhomogeneous medium by emitting high-bandwidth signals, and not to locate scatterers within such a medium or to image the medium per se using narrow-bandwidth, low-frequency waves, as described below.

When it comes to actual imaging, a scheme based on filtering and capable of achieving better cross-range resolution than is possible using traditional techniques (e.g., Kirchhoff migration) in the context of a small active and passive linear transducer arrays is known. The technique is limited, however, to far-field imaging at high-frequency in a homogeneous medium. A theoretical and numerical study of the technique shows that filtering can improve resolution, but that the technique is highly sensitive to the Signal-to-Noise Ratio (SNR). Such sensitivity arises from the use of a least-squares criterion to design the filter and the subsequent ill-conditioning of the reconstruction process (pseudo-inverse of an ill-conditioned matrix).

According to this technique, a goal in designing a filter is to isolate the information in the filtered received signal to small regions of space while negating the effects of perturbations outside these regions as much as possible. Our technique also includes a filer but, unlike the reported technique, which employs a single filter that can improve the refocusing over a large number of locations all at once, our method uses different filters for each location and then proceeds to a rasterizing step (Section 4). Moreover, our filtering/beamforming is presented in the context of low-frequency electromagnetic imaging, unlike the previously reported techniques, which require the use of high-frequency electromagnetic waves.

1.4 Our Contributions

The contributions of this disclosure can be summarized as follows:
 Low-frequency 3D EM Imaging based on Novel Filtering Scheme (Section 4): we present a new computational 3D imaging framework for complex electromagnetic media capable of achieving significantly better range and cross-range resolution than existing techniques at low frequencies.
 Fast Algorithms (Section 3): we introduce powerful new fast algorithms for computing the numerical solution of Maxwell's equations in complex anisotropic media. These algorithms go much beyond current techniques, and are key in making this type of imaging possible.
 Quantification of Resolution (Section 5): we provide a methodology (with numerical examples) to quantify the achievable spatially-dependent resolution given a particular imaging scenario.

Our technique uses the full system of Maxwell's equations (Eq. (7)) without simplifications. The only assumption is that of linearity of the material properties; we assume that the electric displacement and magnetic flux are linearly related to the electric field and magnetic field, respectively, which is a very common assumption. In particular, this implies that the resulting fields carry information about all the properties of the material anisotropic tensors. While various embodiments describe imaging conductive structures in inhomogeneous background, the principles underlying the technique and various other embodiments generalize to more complex problems. Our imaging scheme uses a special type of filtering and rasterizing (Section 4). We underline, however, that low-frequency applications are much less analytically tractable than high-frequency imaging techniques given the absence of closed-form analytical formulas, and that our method, given its computational nature, addresses theses issues at low-frequency.

With few exceptions, various reported techniques that include numerical results do so in two dimensions (2D). In great part, this is due to the computational difficulties associated with performing large electromagnetic simulations. Our fast algorithm can overcome this bottleneck and generally allows us to study fully three-dimensional problems, and to perform imaging on practical scales.

Finally, despite several known techniques and algorithms for low-frequency imaging (Section 1.2), there have been very few quantitative investigations of the achievable resolution, similar to the Rayleigh resolution limit familiar in far-field, high-frequency imaging. Indeed, to the best of our knowledge, there is only one report that addresses the issue, and it uses a monotonicity-based technique on a pre-defined resolution grid. That method is quite different from the broad-range methodology presented here and the other method is significantly more computationally expensive. Furthermore, it may grossly overestimate the resolution given the need for selecting a resolution grid a priori. Our technique is generally not so limited.

2 Theoretical Background

In this section, we introduce the problem and the notation we shall use throughout this paper. First, we designate the three-dimensional electric field and magnetic field by $E(x)$ and $H(x)$, $x \in \mathbb{R}^3$. We also denote the spatially-dependent permittivity, conductivity and permeability tensors by $\epsilon(x)$, $\sigma(x)$ and $\mu(x)$ respectively, and let the constants $\epsilon_0$ and $\mu_0$ be the permittivity and permeability of vacuum, where $\epsilon_0 = 8.85418781 \cdot 10-12$ F/m. $\mu_0 = 1.25663706144 \cdot 10^{-6}$ H/m. These properties characterize the medium through which electromagnetic waves propagate (Maxwell's equations, Eq. (7)). We further restrict our attention to diagonal tensors; i.e., $$\epsilon(x) = \begin{bmatrix} \epsilon^x(x) & 0 & 0 \\ 0 & \epsilon^y(x) & 0 \\ 0 & 0 & \epsilon^z(x) \end{bmatrix},$$

$$\sigma(x) = \begin{bmatrix} \sigma^x(x) & 0 & 0 \\ 0 & \sigma^y(x) & 0 \\ 0 & 0 & \sigma^z(x) \end{bmatrix},$$

$$\mu(x) = \begin{bmatrix} \mu^x(x) & 0 & 0 \\ 0 & \mu^y(x) & 0 \\ 0 & 0 & \mu^z(x) \end{bmatrix}.$$

(6)

The special case where all three diagonal components are equal is referred to as the isotropic case. Such restrictions simplify the analysis and the presentation of the results but do not reduce the scope of the technique, which can deal with general two-tensor fields. Finally, $\omega=2\pi f$ represents the angular frequency (Hz) and $\lambda$ is the wavelength (m), which is assumed to be much larger than the imaging region throughout the paper ($\lambda \gg 1$, low-frequency). Superscripts of the form .x, .y, .z will be used to denote the Cartesian components of the quantity under consideration. In particular, one should not confound the superscript and the argument in the expressions. For instance, $E^y(x)$ refers the y-component of the electric field evaluated at $x \in \mathbb{R}^3$. The physical model underlying the proposed technique includes the time-harmonic (single-frequency) version of Maxwell's equations, $$\nabla \times H(x) - (i\omega\epsilon(x) + \sigma(x))E(x) = J(x)$$

$$\nabla \times E(x) + i\omega\mu(x)H(x) = M(x), \quad (7)$$

where it is assumed that there is no free charge density; i.e., $\nabla \cdot J(x) = 0$. Here, $J(x)$ and $M(x)$ are the electric and magnetic source currents.

This system can be re-written in operator form (following the notation of O. Dorn, et al., "Sensitivity Analysis of a Nonlinear Inversion Method for 3D Electromagnetic Imaging in Anisotropic Media," *Inverse problems*, 18(2):285, (2002), incorporated herein by reference in its entirety) as:

$$\Lambda_M(a,b)u(x) = \begin{pmatrix} -b(x) & \nabla \times \\ \nabla \times & a(x) \end{pmatrix} u(x) = q(x), \quad (8)$$

$$\Lambda_M^*(a,b)v(x) = \begin{pmatrix} -\overline{b(x)} & \nabla \times \\ \nabla \times & \overline{a(x)} \end{pmatrix} v(x) = q(x), \quad (9)$$

where $a(x) = i\omega\mu(x)$, $b(x) = i\omega\epsilon(x) + \sigma(x)$, and $q(x) = \binom{J(x)}{M(x)}$.

Here, $\overline{\cdot}$ represents the conjugate of a complex number, or the conjugate transpose of a matrix depending on the context. $\Lambda_M(a, b)$ is referred to as the forward Maxwell operator, whereas $\Lambda^*_M(a, b)$ is referred to as the adjoint Maxwell operator. We shall assume that sources take the form of point magnetic dipoles; i.e., $$q_j(x) = \begin{pmatrix} 0 \\ m_j \delta(x - x_j) \end{pmatrix}, \quad (10)$$

where the sources are listed through the index $j \in \{1, \ldots, J\}$, $\{m_j\}$ are their respective dipole moments and $\{x_j\}$ represent their locations in $\mathbb{R}^3$. Note that this assumption is by no mean necessary; most sources can be treated numerically using, for instance, properly-discretized single- and/or double-layer (vector) potentials, corresponding to sums of dipoles.

With this notation, the field generated by $q_j(x)$ is denoted $u_j(x)$, and the measured data, denoted $d_j$, corresponds to a vector of size 6·N. If each receiver location is identified by the index $n \in \{1, \ldots, N\}$, the entries of $d_j$ correspond to the field $u_j(x)$ at location $x_n$, i.e., $$d_j = [u_j(x_1); u_j(x_2); \ldots u_j(x_N)], \quad (11)$$

where ";" denotes vertical concatenation. We assume that all six components of the field can be measured and are available for imaging purposes (e.g., using 6-axis receivers). Under the appropriate circumstances (e.g., assuming sufficient regularity of the right-hand side and of the coefficients $a(x)$, $b(x)$, together with the Sommerfeld radiation conditions at infinity) the Maxwell operators map a source distribution $q(x)$ to electromagnetic fields $u(x)$, $v(x)$ through the unique solution of their respective PDE systems (Eq. (8)-(9)). In other words, $\Lambda_M(a,b)^{-1} q(x)$ and $[\Lambda^*_M(a,b)]^{-1} q(x)$ are well-defined. Under this setup, the goal of our imaging scheme can be stated as follows: to determine the medium properties $a(x)$ and $b(x)$ from electrical and magnetic fields measurements $\{d_j\}$ induced by a set of known sources $\{q_j(x)\}$ located outside of the imaging region.

To achieve this goal, our proposed technique relies on three algorithmic components:

1. Adjoint field method (Section 2.1) for the inversion of the data and for gaining theoretical insights into the inverse problem.
2. Low-complexity algorithms (O(N log(N)); Section 3) for the simulation of EM waves through inhomogeneous background media.
3. Filtering and rastering imaging scheme (Section 4) to overcome the shortcomings of the standard adjoint field method and to improve and quantify the resolution.

We note once again that the speed of the aforementioned fast algorithm is an important aspect of our scheme. Indeed, as mentioned in Section 3, fast algorithms allow us to treat large computational problems at practical scales. In the sections that follow, we elaborate on each component.

2.1 Adjoint Method Framework and Sensitivity Function Decomposition

In this section, we introduce the adjoint field method for solving the inverse problem described earlier in Section 2 (see also [15]). The starting point of the scheme is the residual operator, $$R(a,b) = \begin{bmatrix} d_1 \\ d_2 \\ \ldots \\ d_J \end{bmatrix} - \begin{bmatrix} \mu_1 \\ \mu_2 \\ \ldots \\ \mu_J \end{bmatrix} = d - \mu, \quad (12)$$

where $d_j$ are the physically measured data generated through the $j^{th}$ source $q_j(x)$, and $\mu_j = \Lambda_M^{-1}(a,b) q_j(x)$ corresponds to the numerically simulated measurements obtained using medium property estimates $a(x)$ and $b(x)$.

Under this setup, the adjoint field method can be described as an output least-squares method (Section 1.1) where the goal is to recover some distributions $a^*(x)$ and $b^*(x)$ that minimize the squared norm of the residual, i.e., $$(a^*(x), b^*(x)) = \operatorname{argmin}_{a(x), b(x)} \|R(a,b)\|^2 \quad (13)$$

over all admissible distributions $a(x)$ and $b(x)$, where $\|\cdot\|$ represents the $L^2(\mathbb{R}^3)$-norm. To do so, one makes use of three ingredients: 1) a linearization of $R(a, b)$ about the current medium estimate (Fréchet derivative), 2) a least-squares-based Newton-Raphson iteration, and most importantly 3) a computationally-efficient approximation scheme for solving the linear system arising at each Newton-Raphson step.

We begin with a description of the linearization. For this purpose, details regarding the explicit form of the linearized residual operator and its adjoint can be found in Theorem 2.1 below.

Theorem 2.1, Linearized Operators, Multiple Sources: For each source $q_j$, $j=1, \ldots, J$ let $[\mu_j]_n$ be the simulated data vector induced and measured at $x_n$ for $n=1, \ldots, N$ with medium property estimates $a(x)$ and $b(x)$. Further, let $E_j(x)$, $H_j(x)$, $\mathcal{E}_j(x)$ and $\mathcal{H}_j(x)$ be the solutions to the following problems, $$\Lambda_M(a, b) \begin{pmatrix} E_j(x) \\ H_j(x) \end{pmatrix} = q_j(x) \tag{14}$$

$$\Lambda_M^*(a, b) \begin{pmatrix} E_j(x) \\ H_j(x) \end{pmatrix} = \sum_{n=1}^{N} [\mu_j]_n \delta(x - x_n). \tag{15}$$

Then, the linearized residual operator R'[a, b] and its adjoint R'[a, b]* take the form, $$\left[ R'[a, b] \begin{pmatrix} \delta b(x) \\ \delta a(x) \end{pmatrix} \right]_j = \Lambda_M^{-1}(a, b) \begin{pmatrix} \delta b(x) E_j(x) \\ -\delta a(x) H_j(x) \end{pmatrix} \tag{16}$$

$$R'[a, b]^* d = \sum_j \begin{pmatrix} \text{diag}(E_j^x(x)\mathcal{E}_j^x(x), E_j^y(x)\mathcal{E}_j^y(x), E_j^z(x)\mathcal{E}_j^z(x)) \\ -\text{diag}(H_j^x(x)\mathcal{H}_j^x(x), H_j^y(x)\mathcal{H}_j^y(x), H_j^z(x)\mathcal{H}_j^z(x)) \end{pmatrix} \tag{17}$$

where $\delta a(x)$ and $\delta b(x)$ are first-order perturbations about the property fields $a(x)$ and $b(x)$, i.e., $$R(a+\delta a, b+\delta b) = R(a,b) + R'[a,b](\delta a(x), \delta b(x)) + O(\|\delta a(x)\|^2 + \|\delta b(x)\|^2) \tag{18}$$

Intuitively, Theorem 1 states that the linearized residual operator corresponds to the single scattering of the field generated through the current media; fields $E_j(x)$ and $H_j(x)$ are propagated through the background medium with properties $a(x)$ and $b(x)$, and the fields are then "reflected" once by the perturbations $\delta a(x)$ and $\delta b(x)$ acting as scatterers and creating secondary sources—$H_j(x)\delta a(x)$ and $E_j(x)\delta b(x)$ that do not interact together (no multiple scattering). Finally, the resulting signal generated by these secondary sources is recorded at the receivers. As for the adjoint operator, it acts as a backprojection taking a data vector and creating an estimate of the perturbations $\delta a(x)$ and $\delta b(x)$ in image space. The Newton-Raphson step is obtained by minimizing the linearized residual in the least-squares sense, leading to updates of the form, $$\binom{\delta a(x)}{\delta b(x)} = -R'[a,b]^* (R'[a,b]R'[a,b]^*)^{-1} R(a,b) \approx -R'[a, b]^* R(a,b). \tag{19}$$

From a computational standpoint, the crux of the adjoint field scheme in [15] lies in the approximation, $$(R'_j[a,b]R'_j[a,b]^*)^{-1} = c\, I. \tag{20}$$

for some constant c>0, together with a careful selection of the sampling configuration and a filtering (nulling) of the resulting update in the vicinity of sources/receivers. This simplified form leads to major advantages in that the updates can now be computed rapidly through the solution of a single forward Maxwell equation and adjoint problem, without proceeding to an expensive matrix inversion. However, the quality of this approximation depends on many parameters including the imaging configuration and the medium properties. In this sense, it does not always provide satisfying results (see Section 5.1), and further refinements are necessary to overcome these shortcomings. Such refinements are an important aspect of our approach and are presented in Section 4. A discussion and numerical results are also presented in Section 5.

2.2 Sensitivity Function Decomposition

Another important property of the adjoint field method is the availability of a decomposition for the linearized residual operator and its adjoint in terms of sensitivity functions. From an intuitive standpoint, sensitivity functions can be described as follows: a small perturbation of the medium properties at location x leads to a change in the data proportional to the sensitivity function at that particular location. For instance, let the function $\phi(x)\colon \mathbb{R}^3 \to \mathbb{R}^3$ correspond to the sensitivity function associated with a fixed source and receiver, and suppose it is sensitive to perturbations in the $q^{th}$ component of $b(x)$, i.e., in $b^q(x)$. Then, a "small" perturbation $\Delta \cdot \delta(x-x_0)$ of $b^q(x)$ at $x_0$ will lead to a change in the measured data at the receiver of the form: $\Delta \phi(x_0)$.

We underline a few common characteristics of sensitivity functions at low frequency (some of these features are highlighted schematically in FIG. 1. See also FIG. 2):

1. Poor localization: the sensitivity functions are supported over all of $\mathbb{R}^3$, with larger values close to the geodesic between the source and receiver location and largest values near the source and receiver.
2. Smooth non-oscillatory: the sensitivity functions exhibit little variations, except close to the sources and receivers.
3. Complex behavior: the sensitivity functions are complex, vector-valued and exhibit a non-trivial behavior as a function of the source orientation, relative source/receiver locations and background properties.

These characteristics have far-reaching consequences from an imaging perspective. For instance, poor localization and smoothness imply that different perturbations in the properties may lead to very similar perturbations in the data, leading to an ill-conditioned problem. Similarly, the complex behavior implies that it is very difficult to resort to theoretical techniques to derive efficient imaging schemes, and that efficient computational methods must be used.

FIG. 1 schematically depicts example low-frequency sensitivity functions between combinations of six sources (green triangles) and six receivers (blue squares) in a homogeneous medium located in-between the sources and the receivers. Not all receiver/source pairs are represented. Although FIG. 1 shows the same number of sources and receivers, in general, the number of receivers can be different from the number of receivers, and the number of sources and the number of receivers, each, can be any number. Moreover, the sources and receivers can be arranged not just as a liner array (as shown in FIG. 1) but in any two or three-dimensional configuration that can be regular or irregular. For example, the sources and/or receivers can be arranged in an arcuate pattern, zig-zag pattern, polygonal pattern, on the surface of an imaginary sphere, cylindar, or another object, etc. For a particular source/receiver pair, the sensitivity is generally concentrated on the geodesic linking both the source and the receiver, and is largest in magnitude close to the source or receiver (intensity in red). The shapes shown in FIG. 1 are not to scale and only show the typical characteristics of sensitivity functions, including poor localization, smoothness, and complex behavior.

The sensitivity function decomposition is formalized in Theorem 2.2 below.

Theorem 2.2, Sensitivity function decomposition: Let $x_j$ and $x_n$ be a fixed source and receiver location respectively, $m_{j,E}$, $m_{j,H}$ be the source electric and magnetic dipole moments and let $a(x)$ and $b(x)$ be the medium properties. Then, for each perturbation type $c \in \{a, b\}$, perturbation direction $q \in \{x, y, z\}$, measurement field $K \in \{E, H\}$, and measurement component $p \in \{x, y, z\}$ there exist functions $\phi_{j,n}^{p,q}(K, c; y)$ called sensitivity functions such that the linearized residual operator (Eq. (16)) and the linearized residual adjoint operator (Eq. (17)) can be written as $$[R'[a,b]\delta b(x)]_n = \sum_{p \in \{x,y,z\}} \left( \sum_{q \in \{x,y,z\}} \int \delta c^q(y) \phi_{j,n}^{p,q}(y) dy \right) e_p \quad (21)$$

$$(R'[a,b]^* d_j)(x) = \sum_{n=1}^{N} \sum_{p,q \in \{x,y,z\}} d_{j,n}^q \overline{\phi_{j,n}^{p,q}(x)}. \quad (22)$$

Further, the sensitivity functions of the measure field to perturbations in a(x) an b(x) respectively take the explicit form $$\phi_{j,n}^{p,q}(K,a;y) = -H_j^q(y) \mathcal{H}_j^q(y) \quad (23)$$

$$\phi_{j,n}^{p,q}(K,b;y) = E_j^q(y) \varepsilon_j^q(y). \quad (24)$$

where $E_j^q(y)$, $H_j^q(y)$ and $\varepsilon_j^q(y)$, $\mathcal{H}_j^q(y)$ are the solutions of Eq. (14) and Eq. (15) with right-hand sides, $$q(x) = \begin{pmatrix} m_{j,E} \\ m_{j,H} \end{pmatrix} \delta(x - x_j) \quad (25)$$

$$d(x) = \begin{pmatrix} \delta_{K,E} & e_p \\ \delta_{K,H} & e_p \end{pmatrix} \delta(x - x_n), \quad (26)$$

where $\{e_p\}_{p \in \{x,y,z\}}$ is the canonical basis for $\mathbb{R}^3$.

The notation of Theorem 2.2 can be understood as follows: given a fixed source with index j and a fixed receiver located at $x_n$, $\phi_{j,n}^{p,q}(K, b; y)$ represents the size of the change of the $p^{th}$ component of the K-field measured at the receiver due to a small perturbations of the property distribution b(y) in the q-direction.

In some embodiments, the decomposition introduced in Theorem 2.2 forms the backbone of our imaging technique; together with our fast algorithm (Section 3), the explicit form of the decomposition allows us to numerically compute powerful "data filters" that can isolate the effect of perturbations within small regions of space (nullifying effects outside such regions). In turn, this allows us to generate 3D images. This is described in detail in the Section 4.

Figure 2:
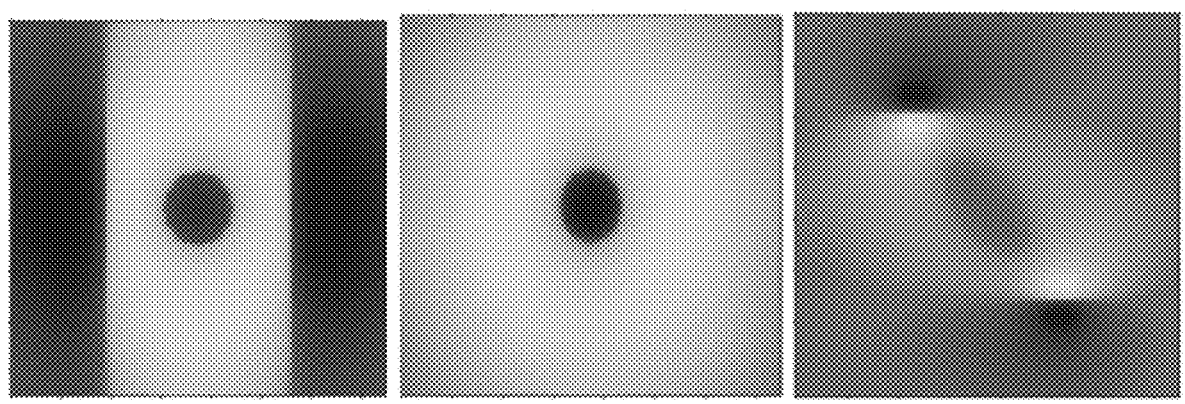
FIG. 2 depicts the real part of an example sensitivity function of the x-component of the electric field to perturbations in material properties.

An actual example of a sensitivity function is shown in FIG. 2 for a homogeneous background. Specifically, FIG. 2 depicts the real part of the sensitivity function of the x-component of the electric field to perturbations $\delta b^x(x)$. The function plotted is sign $$\text{sign}(R(\phi^{(x,x)}(E, b; x))) \left( 60 + 10 \log \left( \frac{|R(\phi^{(x,x)}(E, b; x))|}{\max_x R(\phi^{(x,x)}(E, b; x))} \right) \right).$$

The background is homogeneous with a z-dipole source at (0,0,107) m, a z-component receiver at (0,0,42) m, and $\omega = 30$ kHz ($\lambda \approx 10$ km). The sensitivity is shown, from left to right, in xy-plane, xz-plane, and yz-plane, respectively. FIG. 2 also demonstrates the presence of typical sensitivity functions: poor localization, smoothness and complex behavior. In practice, there are a total of six (6) sensitivity functions per scalar medium property and source/receiver pair, which can all be leveraged for imaging purposes.

3 Fast (O(Nog(N))) Maxwell's Equations Solver

Here, we provide an overview of the algorithm used for simulating the propagation of electromagnetic signals in 3D inhomogeneous media (Eq. (8)-(9)) and for efficiently computing filters in Section 4. This algorithm is important to the practical implementation of our proposed filtering scheme, as it may otherwise be computationally prohibitive using existing computing technology. Consider:

$$\overleftrightarrow{G}(x,y) = \overleftrightarrow{G}(x-y) = \overleftrightarrow{I} G(x-y) + \frac{1}{k_0^2} \nabla \nabla G(x-y), \quad (27)$$

where $\overleftrightarrow{I}$ is the 3×3 identity matrix and $k_0$ is the wavenumber $$G(x) = \frac{e^{ik_0|x|}}{4\pi|x|}$$

is generally referred to as the Helmholtz Green's function, whereas $\overleftrightarrow{G}(x, y)$ is referred to as the dyadic Green's function. G(x) is the fundamental solution to the scalar, homogeneous, time-harmonic wave equation: $(\nabla^2 + k_0) G(x) = -\delta(x)$ in $\mathbb{R}^3$, where $\nabla^2$ is the Laplacian and $\delta(\cdot)$ is a Dirac delta at the origin. Similarly, $\overleftrightarrow{G}(x)$ is the fundamental solution to the time-harmonic vector wave equation: $(\nabla \times \nabla \times - \nabla\nabla \cdot)u(x) + k_0^2 u(x) = -\delta(x) \overleftrightarrow{I}$ in $\mathbb{R}^3$. It can be shown that, $$\begin{bmatrix} E(x) \\ H(x) \end{bmatrix} = \begin{bmatrix} E_0(x) \\ H_0(x) \end{bmatrix} + \begin{bmatrix} A_{11} & A_{12} \\ A_{21} & A_{22} \end{bmatrix} \begin{bmatrix} E(x) \\ H(x) \end{bmatrix}$$

where, $$A_{11}(Q(x)) = -i\omega\mu_0 \int \overleftrightarrow{G}(x,y) \tilde{b}(y) Q(y) dy,$$

$$A_{12}(Q(x)) = \int \nabla \times \overleftrightarrow{G}(x,y)(-\tilde{a}(y)) Q(y) dy \quad (28)$$

$$A_{21}(Q(x)) = \int \nabla \times \overleftrightarrow{G}(x,y) \tilde{b}(y) Q(y) dy,$$

$$A_{22}(Q(x)) = i\omega\epsilon_0 \int \overleftrightarrow{G}(x,y)(-\tilde{a}(y)) Q(y) dy, \quad (29)$$

which, upon appropriate discretization of the integrals, leads to, $$\begin{bmatrix} E(x) \\ H(x) \end{bmatrix} = (I - A)^{-1} \begin{bmatrix} E_0(x) \\ H_0(x) \end{bmatrix},$$

Our solver computes this solution using an iterative linear solver. This requires applications of the dense matrix (I-A) to various vectors, an $O(N^2)$ operation if performed naïvely, and thus too expensive for problems of practical scales. To improve performance, we apply A rapidly using an algorithm that includes generalization of the FFT-based algorithm to electromagnetism (See M. T. Harris, et al., "Fast Large-Scale Algorithm for Electromagnetic Wave Propagation in 3D media," Proc. of 2019 IEEE High Performance Extreme Computing Conference (HPEC) (2019), which is incorporated herein by reference in its entirety). By leveraging the speed of the FFT, this scheme leads to a fast (O(N log(N)) algorithm for the application of the matrix A. We have implemented a parallel version the algorithm in the C programming language using OpenMP, and have used it to produce the numerical results found in Section 5.

4 Filtering and Imaging

Figure 4A:
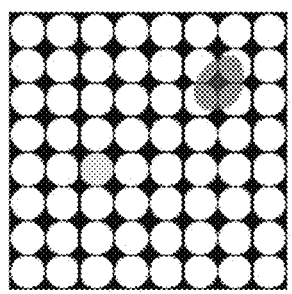
FIGS. 4A-4C are schematics of imaging scheme through steering, filtering, and rastering, according to some embodiments.

As discussed below in Section 5.1, the standard adjoint field method presented in Section 2.1 suffers from many drawbacks at low frequency including a lack of range resolution and poor cross-range resolution. To overcome these shortcomings, we introduce in this section a new imaging scheme. An important characteristic of different embodiments of our method lies in replacing the matrix $(R'[a, b] \ R'[a, b]^*)^{-1}$ in the Newton-Raphson step (Eq. (19)) with a filtering matrix F designed to tailor the sensitivity to regions around specific points in the region to be imaged. We refer to these points as steering points or scattering points. Intuitively, the scheme can be described as follows: first, we choose a set $\{x_l\}$ of steering points (shown in FIGS. 4A-4C) where we want to concentrate/focus the sensitivity; i.e., perturbations in a 3D region surrounding a steering point should have a large effect on the filtered data, whereas perturbations far from the latter should have almost no effect. Then, we proceed to a rasterizing process through each steering point. Points corresponding to the location of a perturbation will lead to a large contribution (weight) after filtering, and vice-versa. This information is used to generate an image.

For all that follows, we consider isotropic perturbations in $b(x)$ only ($\delta b^x(x)=\delta b^y(x)=\delta b^z(x)$, $\delta a(x)\equiv 0$). This has the advantage of significantly simplifying the notation without affecting the generality of the method. A consequence of isotropy is that the quantities found in Theorems 2.1 and 2.2 become $$\phi_{j,n}^P(K; y) = \sum_{q \in \{x,y,z\}} \phi_{j,n}^{P,q}(K, b; y) \tag{30}$$

for the sensitivity functions, and $$R'[a, b]^* d = \sum_{j=1}^{J} \begin{pmatrix} \text{diag}\left(\sum_{q \in \{x,y,z\}} \overline{E_j^q(x)} \mathcal{E}_j^q(x), \sum_{q \in \{x,y,z\}} \overline{E_j^q(x)} \mathcal{E}_j^q(x), \right. \\ \left. \sum_{q \in \{x,y,z\}} \overline{E_j^q(x)} \mathcal{E}_j^q(x) \right) \\ -\text{diag}\left(\sum_{q \in \{x,y,z\}} \overline{H_j^q(x)} \mathcal{H}_j^q(x), \sum_{q \in \{x,y,z\}} \overline{H_j^q(x)} \mathcal{H}_j^q(x), \right. \\ \left. \sum_{q \in \{x,y,z\}} \overline{H_j^q(x)} \mathcal{H}_j^q(x) \right) \end{pmatrix} \tag{31}$$

for the linear residual adjoint operator. To design the filters, we rely heavily on the sensitivity function decomposition of Theorem 2 and proceed as follows: given a fixed steering point $x_l$ and an associated set of filter coefficients $\{f_l(j, n, p, K)\}$, define an induced sensitivity functions through $$\eta_l(y) := \sum_{j,n,p,K} f_l(j,n,p,K) \overline{\phi_{j,n}^p(K;y)}. \tag{32}$$

With this definition and Theorem 2, the filtering process can be expressed as $$\sum_{j,n,p,K} \overline{f_l(j, n, p, K)} d_{j,n,K}^p = \int \delta b(y) \left( \sum_{j,n,p} \overline{f_l(j, n, p, K)} \phi_{j,n}^p(K; y) \right) dy \tag{33}$$

$$= \int \delta b(y) \overline{\eta_l(y)} dy, \tag{34}$$

which is a projection of the perturbation $\delta b(x)$ onto the induced sensitivity function $\eta_l(y)$. In this sense, our goal in designing a filter is to maximize the energy of $\eta_l(y)$ in the vicinity of $x_l$ and minimize it away from $x_l$.

Figure 3A:
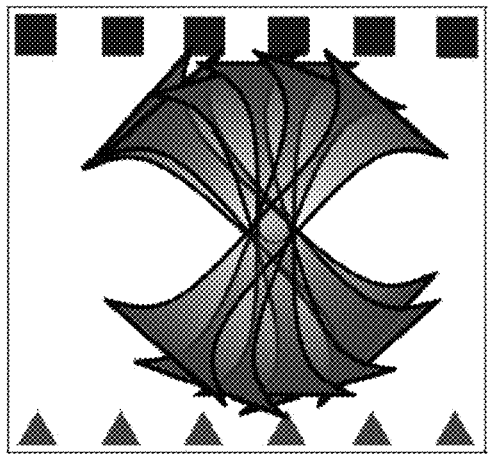
FIG. 3A depicts an example imaging obtained using the standard adjoint field method.
Figure 3B:
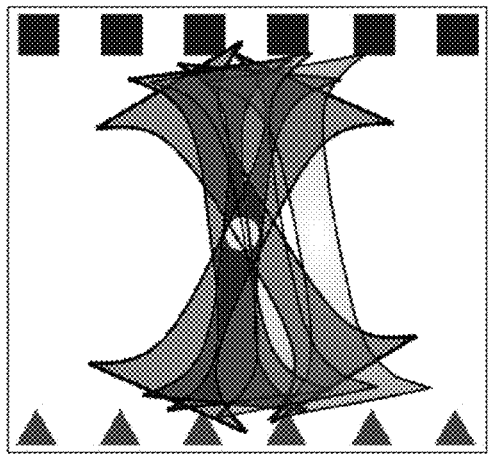
FIG. 3B depicts imaging obtained using an imaging schement according one embodiment.

The filtering process itself is depicted schematically in FIGS. 3A-3B for the case of linear and parallel receiver/source arrays with backward illumination and a steering point located at the center. Specifically, FIGS. 3A and 3B are conceptual schematics of imaging with sensitivity functions. Sources are represented by green triangles and receivers are represented by blue rectangles. The perturbation is located at the yellow circle. In general, there are sensitivity functions between every source and every receiver, but each figure depicts only subsets of such functions, for the sake of clarity.

FIG. 3A depicts an example imaging using the standard adjoint field method (Section 2.1). The image is a linear combination of the sensitivity functions corresponding to the backprojection of the data (Eq. (22), Theorem 2.2. Energy is located over a hyperbolic region, providing poor range resolution. FIG. 3B depicts imaging according to an embodiment of the imaging scheme described herein. The image is a weighted linear combination of overlapping induced sensitivity functions, and corresponds to the backprojection of the filtered data (Eq. (34)). Energy is highest in a small 3D region around the scatterer, providing good range and cross-range resolution.

More specifically, FIG. 3A shows the result of the standard adjoint field method (Section 2.1) that corresponds to setting $f(j, n, p, K)=1$. In this case, the image has energy concentrated in a "hyperbolic" region with cross-section smallest in the plane of the scatterer. This implies that cross-range resolution is achievable with such a scheme. However, this type of image offers no range resolution since the intensity is approximately the same along the whole range direction (and sometimes even larger near the source/receivers, which is erroneous. See FIG. 6). In contrast, FIG. 3B shows the effect of appropriately weighting the sensitivity functions prior to forming the image (our data filtering scheme). In this case, the image produced corresponds to the induced sensitivity function $\eta_l(y)$ associated with this steering point. By design, the induced sensitivity function possesses most energy in a 3D region localized about the point of interest (overlapping weighted sensitivity functions, darker red region in FIG. 3B) which offers both cross-range and range resolution.

In various embodiments, the creation of the filters is followed by a rasterizing process, by which we focus the sensitivity on one steering point at a time to identify locations and size of perturbations. This is depicted pictorially in FIGS. 4A-4C, which are schematics of an imaging scheme through steering, filtering, and rastering. White circles correspond to steering points ($\{x_l\}$). Green circles represent current steering point (region of high sensitivity induced through filtering), and the red region represents the perturbation. In particular, in FIG. 4A, the induced sensitivity region associated with the current steering point (green) does not coincide with the location of a perturbation/scatterer (red). The steering point has no effect on the image and, as such, is designated zero weight.

Figure 4B:
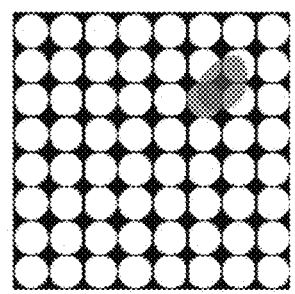
Figure 4C:
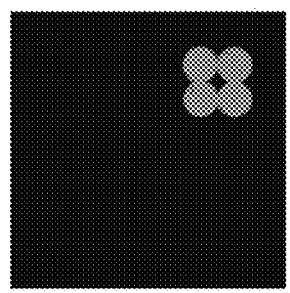

In FIG. 4B, the induced sensitivity region associated with the current steering point (green) coincides with the location of a perturbation/scatterer (red). The steering point will contribute to the image and, as such, is designated a nonzero weight. FIG. 4C shows that the resulting image corresponds to a weighted sum of induced sensitivity functions that approximate the original perturbation.

In general, given some data vector d, we apply the filter $f_l$ to compute $$d_l = f_l f_l^* d \tag{35}$$

for each steering point $x_l$. Then, we backpropagate each of the filtered data and sum the results to produce the image.

The summation step corresponds to a (virtual) form of rasterizing process for induced sensitivity functions with disjoint supports. In the case of an isotropic medium, we obtain $$\mathcal{J} := \sum_l R'[a,b]^* d_l = R'[a,b]^* \left( \sum_l f_l f_l^* \right) d = R'[a,b]^* Fd, \quad (36)$$

where R'[a, b]* is the linearized residual adjoint of Eq. (17), and $F := \sum_l f_l f_l^*$ is the replacement of (R'[a, b] R'[a, b]*)$^{-1}$ in Eq. (19). F can be interpreted as an operator that projects the perturbation onto the induced sensitivity functions for which energy is more closely focused near the perturbation. This process generalizes to any form of sensor measurements when a notion of sensitivity function is present, and is summarized in Algorithm 1 shown below.

Putting everything together, we find that the image $\mathcal{J}$ takes the form, $$\mathcal{J} = \Sigma_l [\int \delta b(y) \eta_l(y) dy) (\Sigma_{j,n,p,K} \overline{f_l(j,n,p,K)} \phi_{j,n}^P(x))] = \Sigma_l [\int \delta b(y) \overline{\eta_l(y)} dy) \eta_l(x)]. \quad (37)$$

This expression shows that the image produced by our scheme is in fact a backprojection of the perturbation on a family of induced sensitivity functions. This use of induced sensitivity functions through the design of appropriate filters gives us more flexibility throughout the imaging process and ultimately leads to higher resolution (Section 5). The design and computation of such filters is discussed below.

---

Algorithm 1: 3D sensitivity-function based imaging algorithm (single-step)

Input: d (data), a(x),b(x) (medium estimates),
$\{f_l\}_{l=1}^L$ (filters associated w/ steering points $\{x_l\}_{l=1}^L$)
Let: $\tilde{d} = 0$
for $l \in \{1,2,...,L\}$ do
$\quad \tilde{d} \leftarrow \tilde{d} + f_l f_l^* d$
end for Compute: $\mathcal{J} = \begin{pmatrix} \delta a(x) \\ \delta b(x) \end{pmatrix} = R'[a,b]^* \tilde{d},$     (Eq.(17))

Output $\mathcal{J}$

---

The procedure for creating a filter can be described as follows: first, we consider a set $G = \{x_\alpha\}_{\alpha=1}^{N_G}$ of "good points" as well as a set $B = \{x_\beta\}_{\beta=1}^{N_B}$ of "bad points". G generally contains a single point corresponding to the current steering point where we want the highest sensitivity, whereas B represents the complement of G in the imaging window where we want to "nullify" sensitivity. For instance, in FIGS. 4A and 4B, the set G includes the green steering point only, whereas B contains all the remaining (white) points. The goal then is to choose filter coefficients $\{f_l\}$ that maximizes the ratio, $$\frac{\sum_{x_\alpha \in G} |\eta_l(x_\alpha)|^2}{\sum_{x_\beta \in B} |\eta_l(x_\beta)|^2} = \frac{\sum_{x_\alpha \in G} \left| \sum_{j,n,p,K} \overline{f_l(j,n,p,K)} \phi_{j,n}^P(x_\alpha) \right|^2}{\sum_{x_\beta \in B} \left| \sum_{j,n,p,K} \overline{f_l(j,n,p,K)} \phi_{j,n}^P(x_\beta) \right|^2}. \quad (38)$$

That is, we seek to maximize the power of the induced sensitivity function over the set G while minimizing it over B. Eq. (38) can be put in matrix form:

$$\operatorname{argmax}_{\{f_l\}} \frac{\|\mathcal{A} f_l\|^2}{\|\mathcal{B} f_l\|^2}, \quad (39)$$

where the ($6N_G \times 6JN$) matrix $\mathcal{A}$ and the ($6N_B \times 6JN$) matrix $\mathcal{B}$ take the form $$\mathcal{A} = \begin{bmatrix} \phi_{(1,1)}^{(x,x)}(E; x_1^{(G)}) & \phi_{(1,1)}^{(x,x)}(H; x_1^{(G)}) & \phi_{(1,1)}^{(x,y)}(E; x_1^{(G)}) & \cdots & \phi_{(1,2)}^{(x,x)}(H; x_1^{(G)}) & \cdots & \phi_{(J,N)}^{(x,z)}(H; x_1^{(G)}) \\ \phi_{(1,1)}^{(y,x)}(E; x_1^{(G)}) & \phi_{(1,1)}^{(y,x)}(H; x_1^{(G)}) & \phi_{(1,1)}^{(y,y)}(E; x_1^{(G)}) & \cdots & \phi_{(1,2)}^{(y,x)}(H; x_1^{(G)}) & \cdots & \phi_{(J,N)}^{(y,z)}(H; x_1^{(G)}) \\ \cdots & \cdots & \cdots & \ddots & \cdots & \ddots & \cdots \\ \phi_{(1,1)}^{(z,x)}(E; x_{N_G}^{(G)}) & \phi_{(1,1)}^{(z,x)}(H; x_{N_G}^{(G)}) & \phi_{(1,1)}^{(z,y)}(E; x_{N_G}^{(G)}) & \cdots & \phi_{(1,2)}^{(z,x)}(H; x_{N_G}^{(G)}) & \cdots & \phi_{(J,N)}^{(z,z)}(H; x_{N_G}^{(G)}) \end{bmatrix} \quad (40)$$

$$\mathcal{B} = \begin{bmatrix} \phi_{(1,1)}^{(x,x)}(E; x_1^{(B)}) & \phi_{(1,1)}^{(x,x)}(H; x_1^{(B)}) & \phi_{(1,1)}^{(x,y)}(E; x_1^{(B)}) & \cdots & \phi_{(1,2)}^{(x,x)}(H; x_1^{(B)}) & \cdots & \phi_{(J,N)}^{(x,z)}(H; x_1^{(B)}) \\ \phi_{(1,1)}^{(y,x)}(E; x_1^{(B)}) & \phi_{(1,1)}^{(y,x)}(H; x_1^{(B)}) & \phi_{(1,1)}^{(y,y)}(E; x_1^{(B)}) & \cdots & \phi_{(1,2)}^{(y,x)}(H; x_1^{(B)}) & \cdots & \phi_{(J,N)}^{(y,z)}(H; x_1^{(B)}) \\ \cdots & \cdots & \cdots & \ddots & \cdots & \ddots & \cdots \\ \phi_{(1,1)}^{(z,x)}(E; x_{N_B}^{(B)}) & \phi_{(1,1)}^{(z,x)}(H; x_{N_B}^{(B)}) & \phi_{(1,1)}^{(z,y)}(E; x_{N_B}^{(B)}) & \cdots & \phi_{(1,2)}^{(z,x)}(H; x_{N_B}^{(B)}) & \cdots & \phi_{(J,N)}^{(z,z)}(H; x_{N_B}^{(B)}) \end{bmatrix} \quad (41)$$

We recall that J is the total number of sources and N is the total number of receivers. Eq. (39) corresponds to a generalized Rayleigh ratio, and can be maximized by solving an appropriate (generalized) eigenvalue problem. The procedure, which we now summarize, is also presented in Algorithm 11. Consider the Singular Value Decomposition (SVD) of $\mathcal{B}$: $\mathcal{B} = U_\mathcal{B} \Sigma_\mathcal{B} V_\mathcal{B}^*$. With this quantity, the generalized Rayleigh ratio takes the form $$\frac{f^* \mathcal{A}^* \mathcal{A} f}{f^* \mathcal{B}^* \mathcal{B} f} = \frac{f^* \mathcal{A}^* \mathcal{A} f}{f^* V_\mathcal{B} \Sigma_\mathcal{B}^2 V_\mathcal{B}^* f}. \quad (42)$$

Proceeding to the change of variable: $f = V_\mathcal{B} \Sigma_\mathcal{B}^{-1} \tilde{f}$, we obtain, $$\frac{\tilde{f}^* \Sigma_\mathcal{B}^{-1} V_\mathcal{B}^* \mathcal{A}^* \mathcal{A} V_\mathcal{B} \Sigma_\mathcal{B}^{-1} \tilde{f}}{\tilde{f}^* \tilde{f}} = \frac{\left\| \mathcal{A} V_\mathcal{B} \Sigma_\mathcal{B}^{-1} \tilde{f} \right\|^2}{\|\tilde{f}\|^2}, \quad (43)$$

which is a standard Rayleigh ratio, the maximum of which is reached when f corresponds to the right singular vector $\xi$ of $\mathcal{A} V_\mathcal{B} \Sigma_\mathcal{B}^{-1}$ associated with the largest singular value. Once computed, we normalize the resulting quantity to get $$f = \frac{V_\mathcal{B} \sum_\mathcal{B}^{-1} \xi}{\left\| R'[a,b]^* V_\mathcal{B} \sum_\mathcal{B}^{-1} \xi \right\|_\infty}. \tag{44}$$

This choice of normalization is based on the explicit form of the image formation expression found in Eq. (36). Indeed, if $\delta b(y) = \text{diag}(\delta b_0, \delta b_0, \delta b_0) \delta(y - y_0)$ is an isotropic point scatterer, then $$\mathcal{J} = [R'[a,b] * (F\ d)] \tag{45}$$

$$= \sum_l \left[ \left( \int \delta b(y) \overline{\eta_l(y)} dy \right) \eta_l(y) \right]$$

$$= \sum_l (\delta b_0 \eta_l(y_0))$$

$$\approx \delta b_0 \eta_{l_0}(y_0),$$

where $l_0$ is the index of the steering point closest to $y_0$. Thus, with this normalization an isotropic point scatterer will produce an image corresponding to the induced (and spatially localized) sensitivity function weighted by the strength of the scatterer (see, e.g., FIG. 8), which lends itself to interpretation and analysis. Also note that other types of normalization (e.g., $\|\cdot\|_2$) are possible in a different context.

One important point to note is that the matrix $\Sigma_\mathcal{B}$, although observed to be generally invertible in our numerical experiments, can be ill-conditioned. For this reason, we generally resort to the use of the pseudoinverse $\Sigma_\mathcal{B}^\dagger$ where, $$\left[ \sum_\mathcal{B}^\dagger \right]_{ii} = \begin{cases} \left[ \sum_\mathcal{B} \right]_{ii}^{-1} & \text{if } \left[ \sum_\mathcal{B} \right]_{ii} \geq \sigma_\tau \\ 0 & \text{o.w.} \end{cases} \tag{46}$$

The choice of the threshold $\sigma_\tau$ depends on two things: resolution and noise. As discussed in details in Section 4.1, there exists a trade-off between the two: the larger the threshold, the lesser the resolution but the greater the robustness to noise and vice-versa.

---

Algorithm 2: Filter computation

Inputs: G (a single steering (good) point),
B (a set nulling (bad) points),
$\sigma_\tau$ (regularization parameters)
Compute: $\mathcal{A}$, $\mathcal{B}$ (Eq.(40)-(41))
Compute: $U_\mathcal{B}$, $S_\mathcal{B}$, $V_\mathcal{B}$ ← SVD ($\mathcal{B}$)
for i ∈ {1,2, . . . ,6JN} do
$[\Sigma_\mathcal{B}^\dagger]_{ii} \leftarrow [S_\mathcal{B}]_{ii}^{-1}$ if $[S_\mathcal{B}]_{ii} > \sigma_\tau$ and 0 otherwise
and 0 otherwise
end for
M ← $\mathcal{A} V_\mathcal{B} \Sigma_\mathcal{B}^\dagger$
f ← principal eigenvector of M*M
Normalize f (Eq. (44))
Output: f

---

4.1 Effects of Noise

In this section, we describe the effects of additive measurement noise on the quality of the images generated through our proposed scheme. For this purpose, we define the Signal-to-Noise Ratio (SNR) as, $$SNR = \frac{\|d\|^2}{\mathbb{E}[\|v\|^2]} = \frac{\|d\|^2}{N\sigma^2}, \tag{47}$$

where $v$ corresponds to a Gaussian noise vector with covariance $\sigma^2 I$; i.e., $v \sim \mathcal{N}(0, \sigma^2 I)$, and N is the total number of measurements.

Then, we have the following lemma. In everything that follows, $\|\cdot\|_\infty$ refers to the maximum of the vector and $\|\cdot\|$ is the 2-norm of the vector.

Lemma 4.1 (Quantification of noise effects): Let $v$ be a zero-mean Gaussian random vector with covariance matrix $\sigma^2 I$, i.e., $v \sim \mathcal{N}(0, \sigma^2 I)$, and let $$R'[a,b]*F(d+v) = \Sigma_{l=1}^L R'[a,b]*(f_l f_l^*)(d+v) \tag{48}$$

correspond to the image formation operator described in Eq. (36) applied to data (d) corrupted by noise (v). Assume further that the images of the filters $\{R'[a,b]*f_l\}_{l=1}^L$ satisfy $$(R'[a,b]*f_{l_1})*(R'[a,b]*f_{l_2}) = 0, \tag{49}$$

for $l_1 \neq l_2$. Then, $$\mathbb{P}\left( \left\| \sum_{l=1}^L R'[a,b]^*(f_l f_l^*) v \right\|^2 \geq \epsilon \|\mathcal{J}\|_\infty^2 \right) \leq \frac{\sigma^2}{\epsilon \|\mathcal{J}\|_\infty^2} \sum_{l=1}^L \|f_l\|^2, \tag{50}$$

where: $\mathcal{J} := \Sigma_{l=1}^L R'[a,b]*(f_l f_l^*)$ is the original noiseless image.

Remark. In practice, orthogonality in Eq. (49) does not always hold. However, when $l_1 \neq l_2$, the induced sensitivity functions are approximately supported on disjoint sets (localized around different steering points) in such a way that Eq. (49) holds approximately.

Now, we recall from Eq. (43) and Eq. (46) that $$\|f_l\|_2^2 \sim \xi^*_l(\Sigma_{\mathcal{B}_l}^\dagger)^2 \xi_l \leq \sigma_\tau^{-2}, \tag{51}$$

where $\Sigma_{\mathcal{B}_l}^\dagger$ is the pseudo-inverse of the diagonal matrix of singular values of the sensitivity matrix $\mathcal{B}_l$ associated with the $l^{th}$ steering point $x_l$. Therefore, Lemma 4.1 and the definition of SNR imply that, $$\mathbb{P}\left( \left\| \sum_{l=1}^L R'[a,b]^*(f_l f_l^*) v \right\|^2 \geq \epsilon \|\mathcal{J}\|_\infty^2 \right) \leq \tag{52}$$

$$\frac{1}{\epsilon SNR \|\mathcal{J}\|_\infty^2} \frac{\|d\|^2}{N} \sum_{l=1}^L \xi_l^* \left( \sum_{\mathcal{B}_l}^\dagger \right)^2 \xi_l$$

$$\leq \frac{1}{\epsilon SNR \|\mathcal{J}\|_\infty^2} \frac{\|d\|^2}{N} \frac{L}{\sigma_\tau^2}, \tag{53}$$

from which we conclude that the probability that the relative energy of the noise induced in the image dominates that of the original image is bounded by a quantity proportional to the amount of regularization applied (higher regularization implies lower probability) and inversely proportional to the SNR. This behavior is commonly encountered in the field of imaging. Our derivation, however, provides explicit estimates in this particular context.

Figure 9:
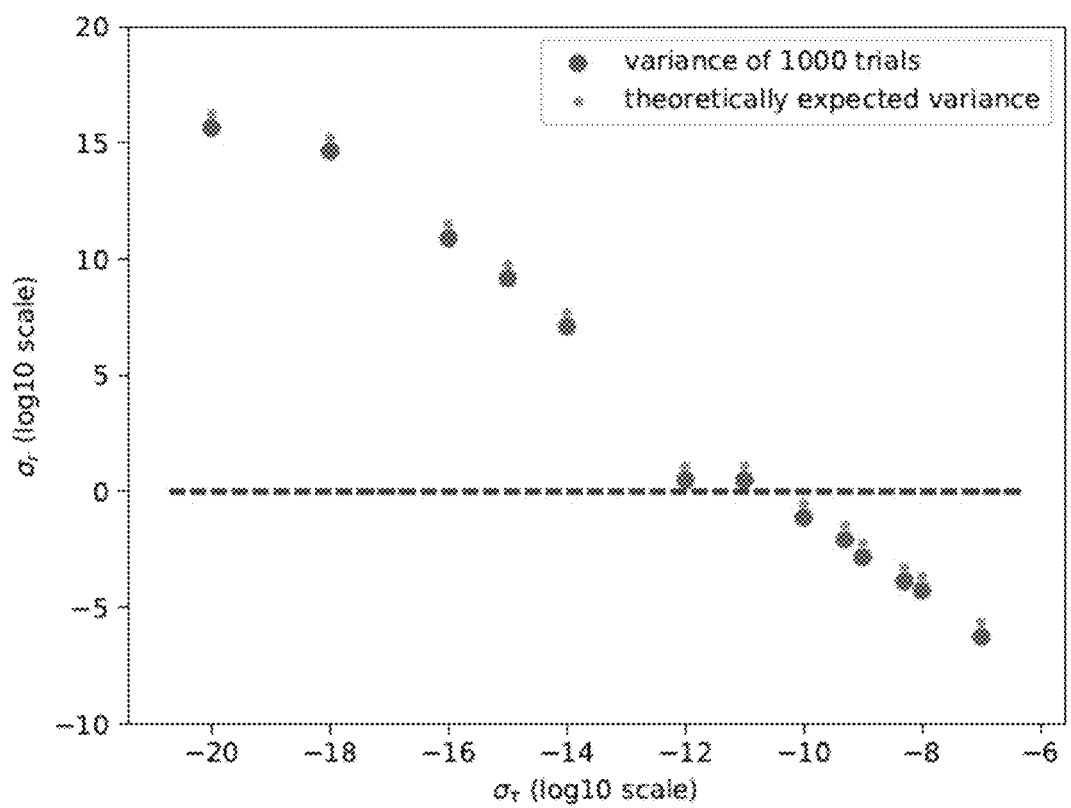
FIG. 9 illustrates the variance of the imaging scheme according to one embodiment as a function of regularization parameter.

There is currently no known closed-form expression to describe the behavior of the singular values of the sensitivity matrices $\{\mathcal{B}_l\}$ as a function of the imaging parameters such as the location and number of sources and receivers, the orientation of the dipole sources, the background medium, etc. Further, a highly non-trivial relationship was observed through numerical experiments (Section 5.2), an example of which is shown in FIG. 9. We thus restrict ourselves to a computational approach in which we fix the imaging setup, compute the SVDs of $\{\mathcal{B}_l\}$, and pick $\sigma_\tau$ so that the left-hand side of Eq. (52) lies below some user-provided threshold p.

5 Numerical Results

In this section, we present extensive numerical results for the performance and capabilities of our imaging scheme. The section contains four subsections:

Section 5.1 provides comparison with common techniques (Section 1.1) and shows that the proposed imaging scheme offers significant resolution improvements over those competitors.

Section 5.2 addresses the effects of noise described in Section 4.1 from a numerical standpoint.

Section 5.3 discusses a case of low-frequency imaging in a highly-inhomogeneous medium, namely, a finite conductor located within a conducting box.

Section 5.4 presents "resolution maps," which provide a methodology for quantifying the spatially-dependent resolution achievable with the proposed scheme under specific imaging configurations.

Unless otherwise stated, all examples use a frequency of f=1 kHz ($\lambda \approx 300$ km), and all necessary wave propagation simulations are computed using the algorithm introduced in Section 3 with a stopping criterion of $\delta=10^{-8}$. Scatterers are assumed to be isotropic point perturbations (Dirac delta) in conductivity only; i.e., $\sigma(x) = \Sigma_{n=1}^{N} \sigma_n I_{3\times3} \delta(x-x_n)$. The imaging configuration consists of a back-lit, parallel linear arrays imaging setup (FIG. 12) made up of square arrays of sources (orange cubes) and receivers (blue triangles) perpendicular to the z-axis, and located at $z=\pm 150$ m respectively. Sources are ideal dipoles, and receivers are assumed to be noise-free (SNR=$\infty$) and capable of measuring all six components of the electromagnetic field. Finally, a homogeneous background corresponds to a medium with the properties of free space: $\epsilon(X)=\epsilon_0=8.854187\cdot 10^{-12}$ F/m, $\mu(x)=\mu_0=1.256637\cdot 10^{-6}$ H/m, $\sigma(x)=0$ S/m.

5.1 Comparison with Existing Techniques

In this section, we compare our proposed scheme with two commonly-encountered low-frequency imaging schemes: output least-squares with Tikhonov regularization and nonlinear block-Kaczmarz output least-squares (Section 1.1). In these examples, a single conductive scatterer with strength $\sigma_0=1$ S/m is located at (22,0,22) in a homogeneous background.

The results are displayed in FIGS. 6A-6F, 7A-7F, and 8A-8F, each of which shows six cross-sectional (2D) views of the reconstructed (3D) image, respectively, for each case under considerations. Specifically, FIGS. 6A-6F show cross-sectional (2D) views of the (3D) image reconstructed using output least-squares with Tikhonov regularization. Scatterer is located at (22,0,22) m between a 3×3 source and receiver parallel arrays at z=±150 m. From left to right, top to bottom, FIG. 6A shows the xy-plane, z=22 m; FIG. 6B shows the xy-plane, z=−50 m; FIG. 6C shows the xz-plane, y=22 m; FIG. 6D shows the xz-plane, y=0m; FIG. 6E shows the yz-plane, x=22 m; and FIG. 6F shows the yz-plane, x=−50 m. These figures demonstrate that the cross-range resolution is poor, and that there is no range resolution.

Figure 7A:
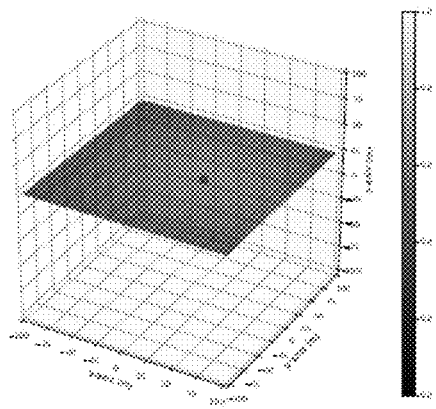
FIGS. 7A-7F show cross-sectional (2D) views of the (3D) image reconstructed using the block-Kaczmarz (single-sweep) nonlinear output least-squares.
Figure 7B:
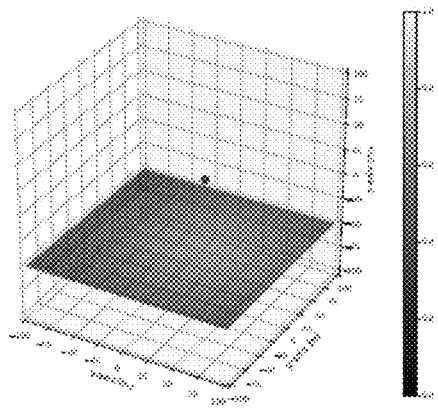
Figure 7C:
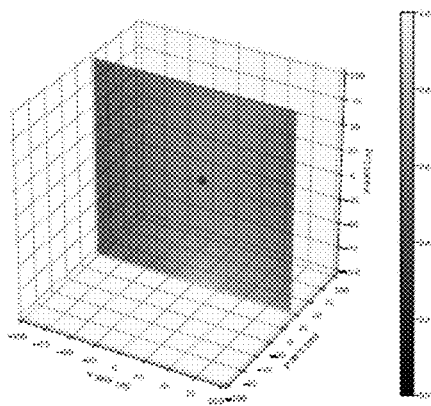
Figure 7D:
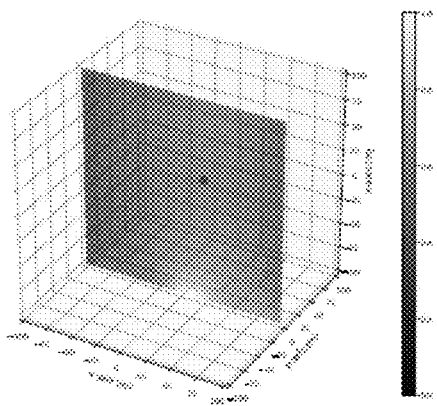
Figure 7E:
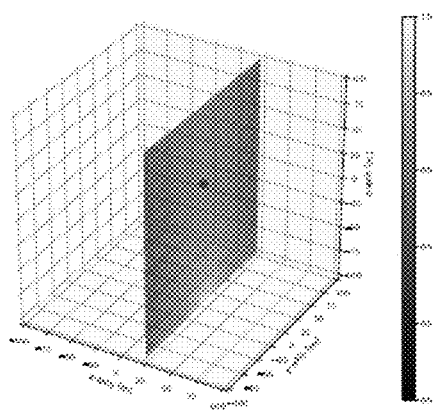
Figure 7F:
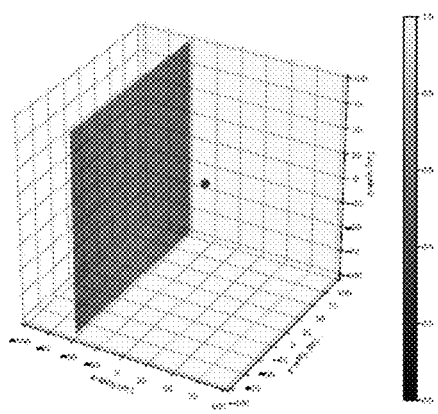

FIGS. 7A-7F show cross-sectional (2D) views of the (3D) image reconstructed using the block-Kaczmarz (single-sweep) nonlinear output least-squares. Scatterer is located at (22,0,22) m between a 3×3 source and receiver parallel arrays at z=±150 m. From left to right, top to bottom: FIG. 7A shows the xy-plane, z=22 m; FIG. 7B shows the xy-plane, z=−50 m; FIG. 7C shows the xz-plane, y=22 m; FIG. 7D shows the xz-plane, y=0m; FIG. 7E shows the yz-plane, x=22 m; and FIG. 7F shows the yz-plane, x=−50 m. Here again, the cross-range resolution is poor, and there is no range resolution. This is qualitatively similar to the results displayed in FIGS. 6A-6F.

Figure 8A:
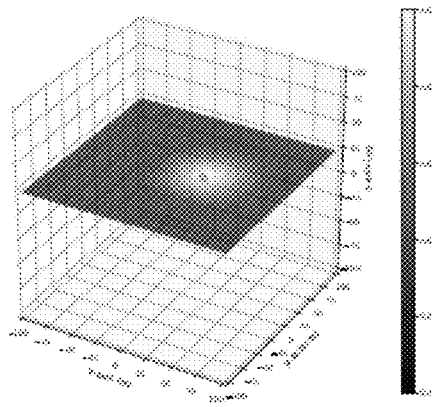
FIGS. 8A-8F show cross-sectional (2D) views of the (3D) image reconstructed using an imaging scheme according to one embodiment.
Figure 8B:
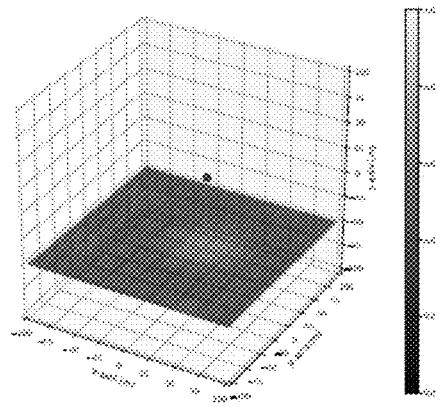
Figure 8C:
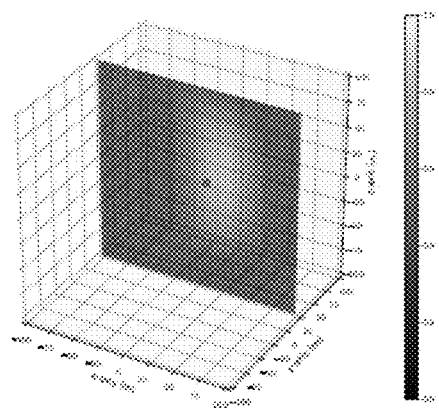
Figure 8D:
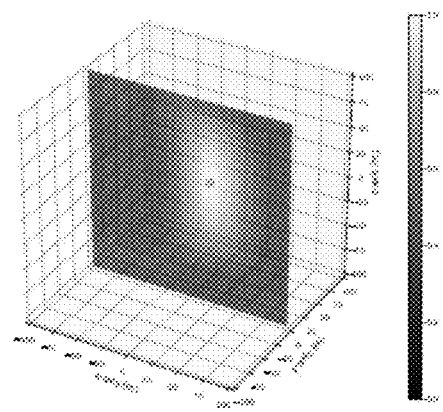
Figure 8E:
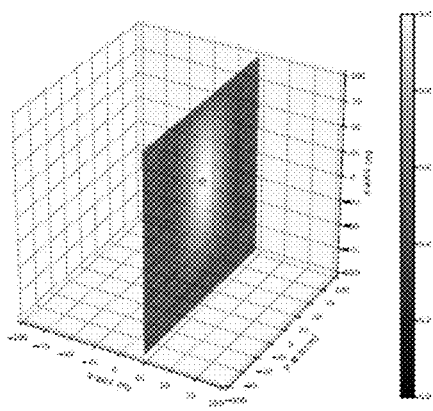
Figure 8F:
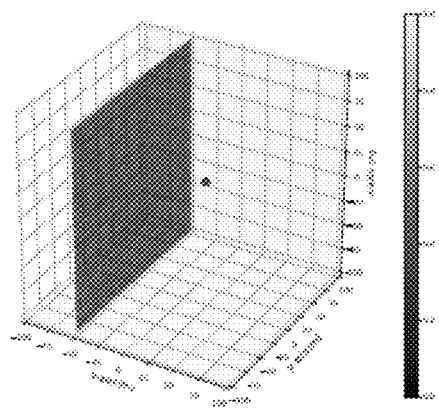

FIGS. 8A-8F show cross-sectional (2D) views of the (3D) image reconstructed using an embodiment of our imaging scheme. Scatterer is located at (22,0,22) m between a 3×3 source and receiver parallel arrays at z=+150 m. From left to right, top to bottom: FIG. 8A shows the xy-plane, z=22 m; FIG. 8B shows the xy-plane, z=−50 m; FIG. 8C shows the xz-plane, y=22 m; FIG. 8D shows the xz-plane, y=0m; FIG. 8E shows the yz-plane, x=22 m; and FIG. 8F shows the yz-plane, x=−50 m. Here, both cross-range and range resolution are significantly superior to existing techniques.

In summary, as can be seen, both the output least-squares and the Kaczmarz method (FIGS. 6A-6F and 7A-7F, respectively) produce very similar output that provide relatively low cross-range resolution and no range resolution (in fact, the location of highest intensity in the range direction is closest to the receiver array, which is erroneous). On the contrary, our method generates images with significantly better cross-range resolution and range resolution, as can be seen in FIGS. 8A-8F.

It is important to note that these comparisons are done on the basis of a single (outer) iteration, whereas it has been shown elsewhere in that multiple outer iterations (sweeps) can improve the results. In this sense, we wish to underline two points: first, the studies discussing multiple iterations pertain to cross-range resolution only; no numerical results have demonstrated range resolution. Secondly, although some embodiments focus on a single-step imaging, in other embodiments feature an iterative descent framework for nonlinear inversion, as described in Section 2.1.

Finally, it should also be noted that our technique provides better cross-range resolution than range resolution in this parallel array setup. This is expected, at least qualitatively, given the discussion of Section 4 and the nature of the sensitivity functions (FIG. 3B). Section 4 also elucidates the nature of the image obtained through the least-square and Kaczmarz methods (FIG. 3A). Finally, the fact that the output least-squares and the Kaczmarz methods generate similar images can be explained by the fact that, in this particular setup, the approximation in Eq. (20) is an appropriate one.

5.2 Effects of Noise

Figure 5A:
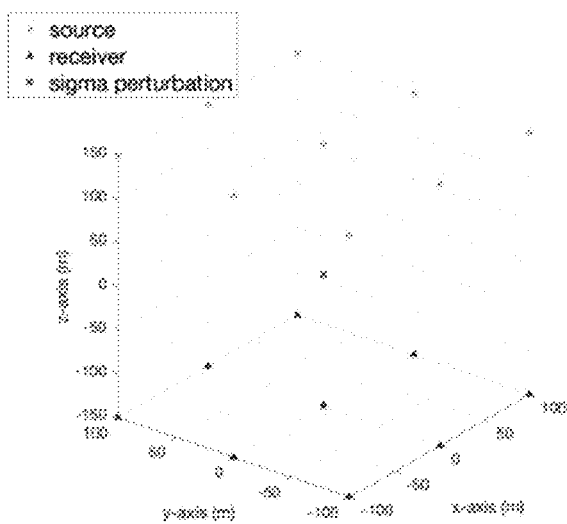
FIGS. 5A and 5B depict imaging setups of sources and receivers arrays, according to two embodiments.
Figure 5B:
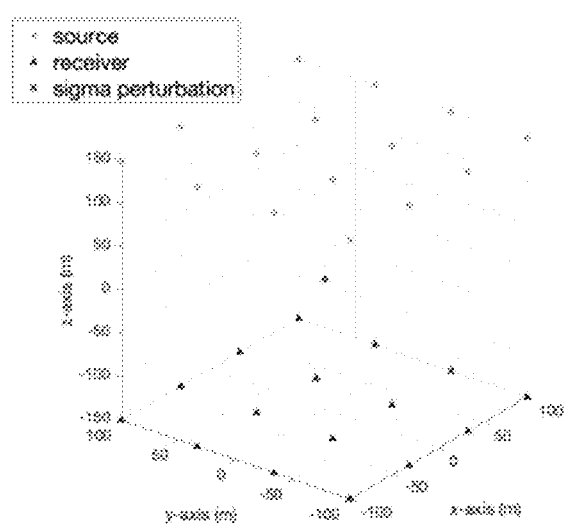

Here, we provide numerical examples and describe the effects of additive noise on image quality and resolution. To do so, we consider the 4×4 planar array setup as shown in FIG. 5B. FIGS. 5A and 5B depict, respectively, back lit, parallel linear arrays imaging setup with 3×3 or 4×4 sources and receivers arrays. Our simulations are based on Eq. (52); first, we fix the imaging setup (FIG. 5B). We numerically generate data for a single scatterer at the origin, and add Gaussian noise to reach a SNR level of 60 dB. Then, we construct filters based on Algorithm 11 for various threshold values, i.e., $\sigma\tau \in \{10^{-19}, 10^{-10}, 10^{-20}\}$. Finally, we proceed to the imaging following Algorithm 1. The results of the numerical simulations are shown in FIGS. 10-12.

The regularizing threshold values (a) were chosen according to the methodology described in Section 4.1 and the behavior of the singular values of the sensitivity matrices, as shown in FIG. 9. Specifically, FIG. 9 illustrates the variance of the imaging scheme according to one embodiment as a function of regularization parameter $\sigma_\tau$. The good point set G corresponds to the origin, bad point set B corresponding to a 19×19×19 uniform grid (excluding the origin). This is with z-polarized dipole sources and 6-axis receivers in the parallel array setup, and the frequency is 1000 Hz. The "variance" plotted, $\sigma_r$, corresponds to right hand side of Eq. (52). The variance of 1000 trials is the variance computed from 1000 random vectors v, and the theoretical value is the value of the expression in this instance of 60 dB of SNR. The geometry has 4×4 xy-plane source and receiver arrays located at z=±150 m. To get the variance on the image to be less than the order of magnitude of the data, the smallest $\sigma_\tau$ that has $\sigma_r \ll 1$ should be chosen.

Figure 10:
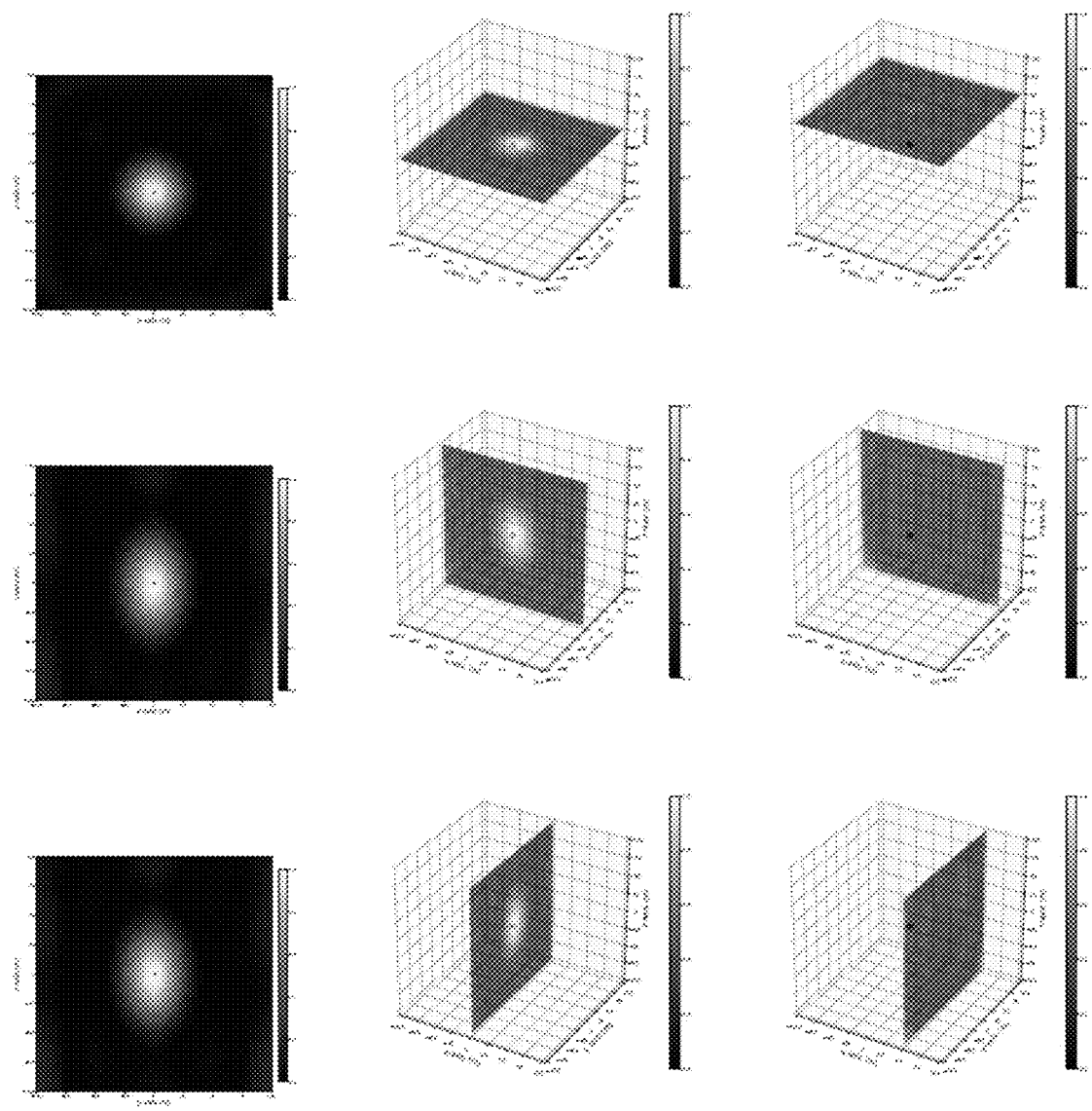
FIG. 10 depicts an imaging process according to one embodiment, as applied to uncorrupted data.

FIG. 10 depicts an imaging process according to one embodiment, as applied to uncorrupted data. A single conductivity scatterer is located at the origin. The SNR=∞, and 4×4 sources/receivers arrays (as shown in FIG. 5B) are used. The scatterer can be appropriately localized, as can be seen in FIG. 10.

Figure 11:
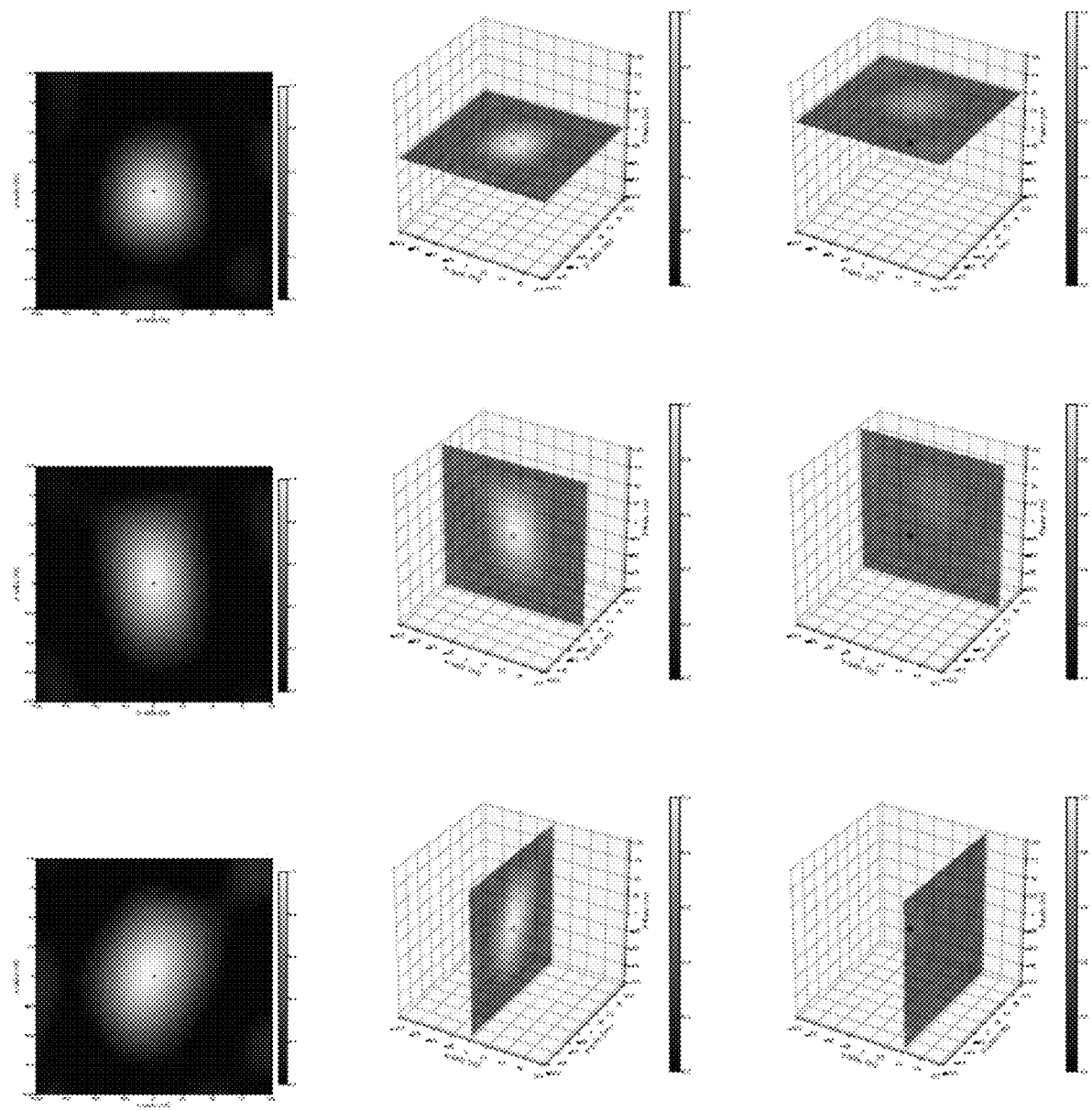
FIG. 11 depicts an imaging process according to one embodiment, as applied to Gaussian noise-corrupted data, with a certain regularization parameter.
Figure 12:
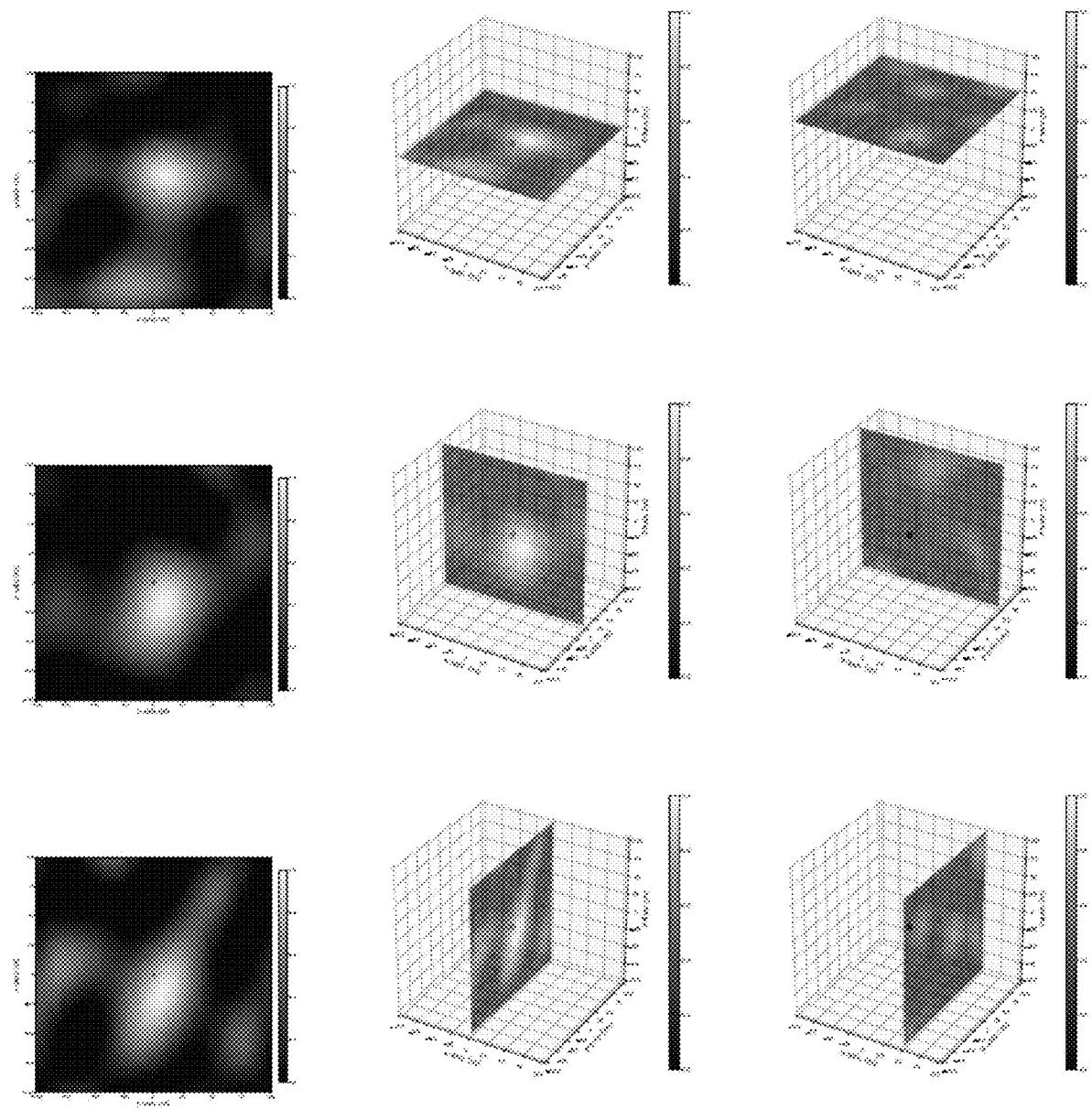
FIG. 12 depicts an imaging process according to one embodiment, as applied to Gaussian noise-corrupted data, where a different regularization parameter.

FIG. 11 depicts an imaging process according to one embodiment, as applied to Gaussian noise-corrupted data, with a certain regularization parameter. A single conductivity scatterer is located at the origin. The SNR=60 dB, the regularization parameter $\sigma_\tau = 10^{-9}$, and 4×4 sources/receivers arrays (as shown in FIG. 5B) are used. The scatterer can be appropriately localized, but the resolution is poorer due to the regularization.

FIG. 12 depicts an imaging process according to one embodiment, as applied to Gaussian noise-corrupted data, where a different regularization parameter. A single conductivity scatterer is located at the origin. The SNR=60 dB, the regularization parameter $\sigma_\tau = 10^{-10}$, and 4×4 sources/receivers arrays (as shown in FIG. 5B) are used. The image is noisy and the scatterer can no longer be localized due to an inappropriate amount of regularization.

The value $\sigma_\tau = 10^{-10}$ (FIG. 12) corresponds to an "under-regularized" case, whereas the value $\sigma_\tau = 10^{-9}$ (FIG. 11) is appropriately regularized. Correspondingly, it is seen that the under-regularized case produces a highly-noisy image with very poor localization compared with the other two cases. Further, it becomes apparent from looking at FIGS. 10-11 that the amount of regularization has a significant impact on the achievable resolution. Better resolution is obtained in the infinite SNR case in which lower regularization was possible as discussed in Section 4.1.

5.3 Inhomogeneous Background

We now discuss low-frequency imaging in an inhomogeneous imaging region or medium. An inhomogeneous medium is a region that include different materials or materials having substantially different properties. As used herein, "substantially different" generally means that the variation in a material property is more than 0.5%, 2%, 5%, 10%, 20%, etc. A medium that is not inhomogeneous may be designated a homogeneous medium. In general, in an inhomogeneous medium a conductive material may be surrounded, at least partially, by a dielectric material such as air, water, or soil. Likewise, one conductive material may be surrounded, at least partially, by another conductive material having different properties, or a dielectric material may be surrounded by a conductive material, or a dielectric material may be surrounded by another dielectric material having different properties.

Figure 13:
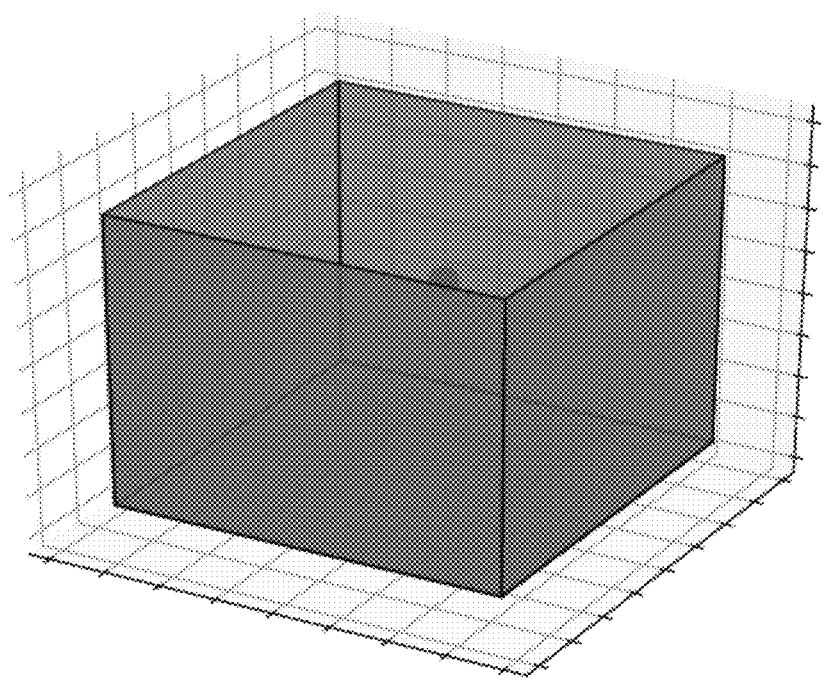
FIG. 13 depicts an example inhomogeneous medium or material to be imaged, using various embodiments.

In our experiment, we consider a background having a thick conductive box with one open side. FIG. 13 depicts such a conductive three-dimensional square enclosure with the top wall removed. The dimensions of the box are 176×176×176 m, and the box has approximately 16 m-thick walls of conductivity 1S/m. It is assumed that all corners and sides are sealed and smooth, with the exception of the open face. This is an idealization since realistic structures are generally corrugated and have various types of gaps. The scatterer to be imaged corresponds to a Gaussian with a standard deviation of 8 m centered at (0,20,20)m and having maximum conductivity of $10^3$ S/m. The imaging setup consists of 25 sources and 25 receivers distributed uniformly at random on a sphere of radius 180 m (full aperture). The sources have coordinates x<0 and the receivers have coordinates x>0. Sources are randomly oriented magnetic dipoles, and receivers can measure all 6 components of the EM field.

We note that the properties of the box walls imply a skin depth of approximately 16 m at $10^3$ Hz, and 2 m at $10^9$ Hz. This means that the low-frequency waves employed here can penetrate through the wall and provide full-aperture view of the scatterer. Typical high-frequency imaging using millimeter waves (radar) would see emitted pulses either bounce off the wall or enter the box through the opening only to undergo multiple scattering once inside, thus making existing (linear) high-frequency imaging techniques inadequate.

For these imaging examples, efficient algorithms for solving Maxwell's equations were important. Computing the residual vector requires solutions of as many problems as there are sources. In this case, that was 25. Further, the sensitivity functions for each source and each receiver component of every receiver needed calculation. For this problem that is 25+6·25=175 problems. Every one of these problems was solved on a grid of 50×50×50 voxels, each possessing $6 \cdot 25^3 \approx 10^5$ unknowns.

Figure 14:
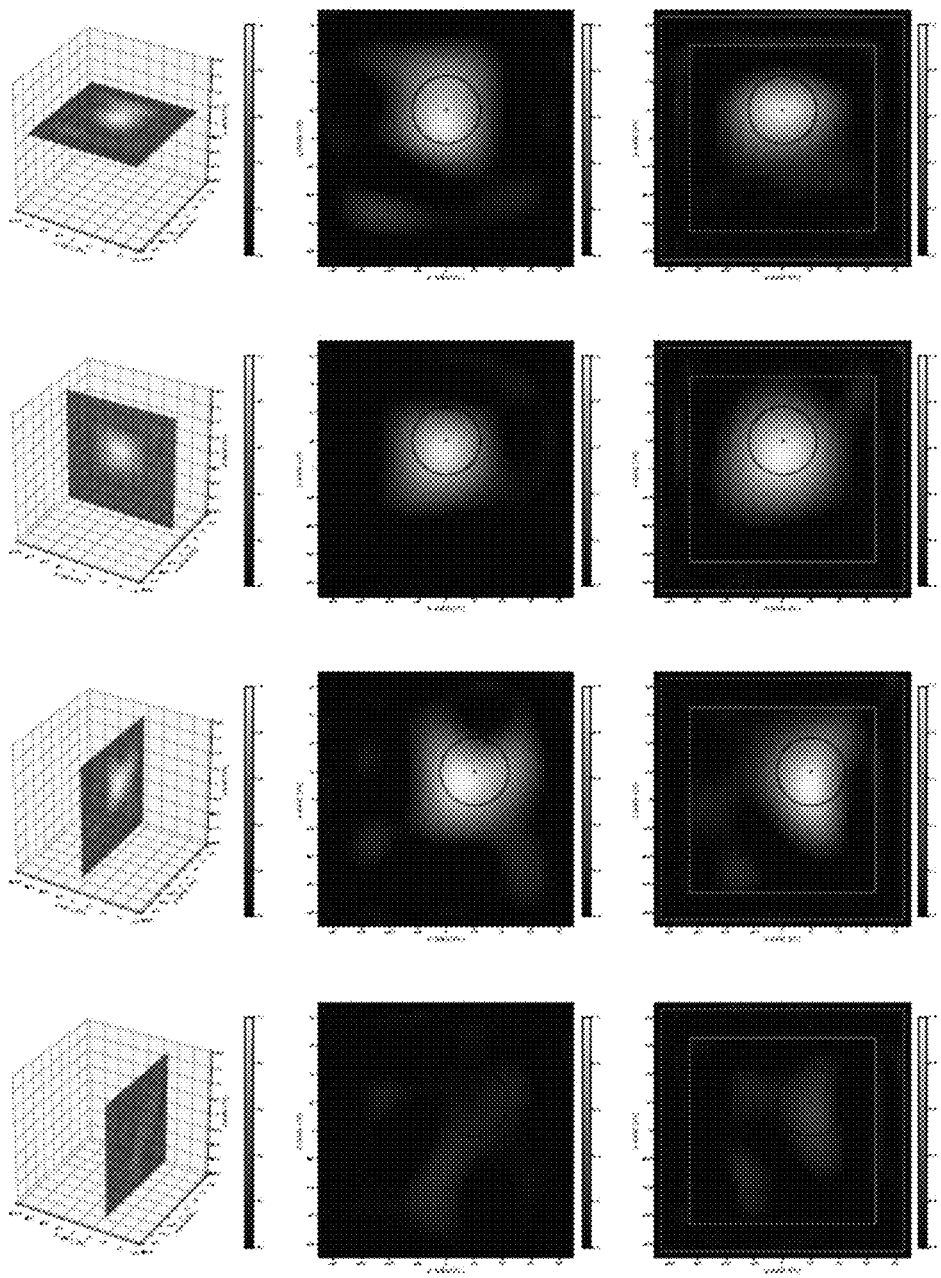
FIG. 14 illustrates an imaging process according to one embodiment, as applied to an example inhomogeneous medium or material.

Results are shown in FIG. 14, which compares the image obtained in the absence (left) and presence (right) of the box, respectively. In particular, an imaging process according to one embodiment, is applied to a conductive spherical scatterer located at (0,20,20)m inside a conductive square box of dimension 176×176×176 m centered at the origin and having 20 m thick walls (red dashed line). Images on the left correspond to 3D cross-sections, with no conductive box. Images in the middle correspond to 2D cross-sections, with no conductive box. Images to the right correspond to 2D cross-sections, having the conductive box. The red dashed line delineates the boundary of the box. The resolution achieved in the presence of the box is similar to the resolution achieved in its absence. In these simulations, LGMRES was used with a tolerance of $10^{-14}$ and the regularization parameter $\sigma_\tau$ was set to $10^{-8}$.

Our first conclusion is that it is indeed possible to localize a scatterer within a conductive structure using low-frequency waves. We also notice that the resolution of the image in the presence of the box is only slightly poorer than that obtained in a homogeneous medium, leading us to conclude that resolution is more likely to be affected by noise, as previously observed, than by known penetrable structures. Finally, it is worth mentioning that although the structure was assumed to be known in this example, this is not necessary for the scheme to succeed; unknown elements in a structure will appear as perturbations/scatterers in our image.

5.4 Resolution Maps

In this final section, we introduce the notion of a resolution map. In short, a resolution map provides a pointwise estimate of the best resolution achievable through our proposed technique. Here, by resolution at a point we mean the minimum distance between a scatterer at this particular point and any other scatterer such that they can be distinguished. This concept of resolution requires that the single-scattering, or Born approximation, holds among scatterers, but not between the scatterers and the background. In particular, we note that this concept becomes equivalent to the traditional concept of resolution, or Rayleigh criterion, as the wavelength goes to zero (high-frequency asymptotics). At low frequency, however, we find that resolution exhibits interesting properties such as spatial and directional dependence.

The methodology for creating a resolution map is relatively simple and can be described as follows: given some background medium properties $\epsilon(X)$, $\mu(x)$ and $\sigma(x)$ and a set of points where one would like to know the resolution (e.g., a fine regular grid), compute a filter as described in Section 4 (Algorithm 11) for each such point and plot the induced sensitivity function $\eta(x)$ (Eq. (34)). Then, given a resolution level $0<\gamma<1$ corresponding to the percentage of the maximum of the filter centered $x_0$ below which its value is considered negligible (we pick $\gamma=0.5$ in our examples) and a unit direction vector $\vec{d}$, the resolution at $x_0$ is defined as, $$\lambda_{\gamma,\vec{d}}(x_0)=_x^{sup}\{\vec{d}\cdot(x-x_0):|\phi(x_0+(\vec{d}\cdot(x-x_0))\vec{d})\geq\gamma|\phi(x_0)|\}. \quad (54)$$

Figure 15:
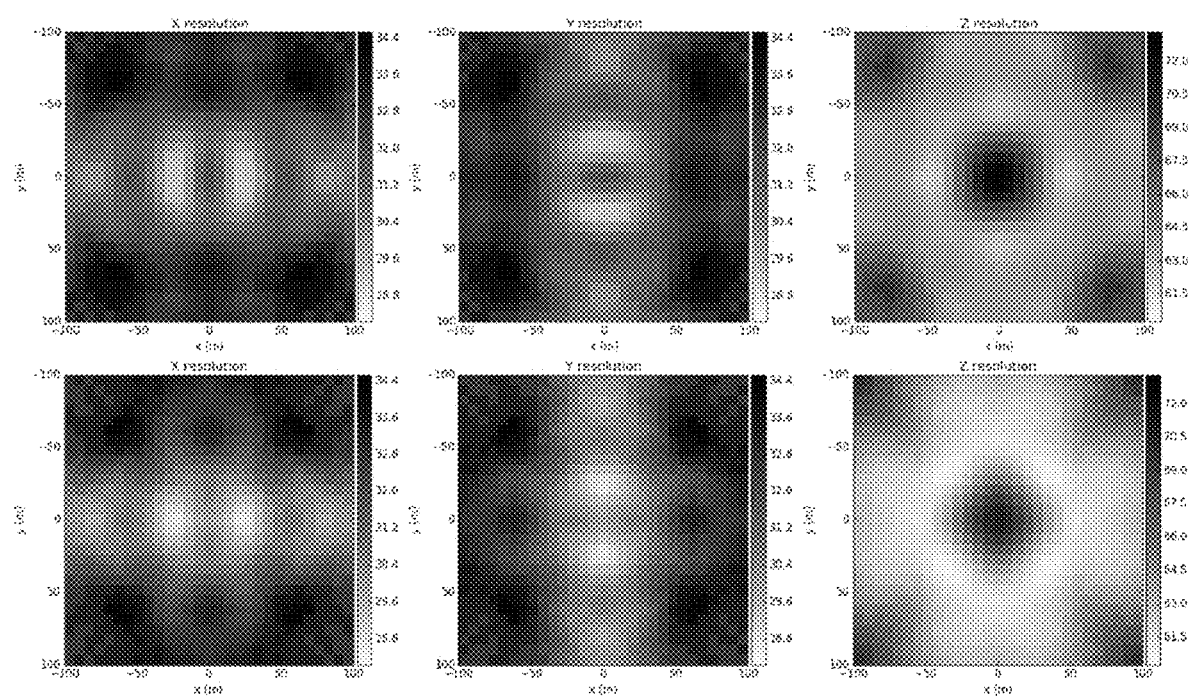
FIG. 15 is a resolution map with homogeneous background medium, obtained from an imaging process according to one embodiment.

Resolution maps for a homogeneous background with 3×3 parallel arrays are shown in FIG. 15, which is a resolution map with homogeneous background medium. Parallel 3×3 source/receiver arrays are used for imaging in a configuration located in the xy-plane at z=±150 m. Images from left to right show the resolution along the x-, y- and z-directions, respectively. The top images correspond to the xy-plane, at z=0 m. The bottom images correspond to the xy-plane, at z=40 m. FIG. 15 demonstrates, among other things, that better resolution is achieved for steering points closer to the source and/or receiver arrays, and that the resolution exhibits a complex spatially-dependent behavior.

6 Conclusion

In conclusion, we have introduced a novel scheme based on a fast algorithm for the simulation of electromagnetic waves traveling through complex 3D media for the purpose of three-dimensional imaging using low-frequency electromagnetic waves that shows superior computational performance and improved resolution over existing techniques. Finally, we numerically demonstrated the improved resolution of the proposed technique over existing techniques, studied the effects of noise, introduced a resolution map methodology and provided imaging results in complex media for which existing high-frequency techniques are deemed inadequate.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for determining one or more physical properties of material, the method comprising:
    activating a plurality of electromagnetic radiation sources one at a time, to direct electromagnetic radiation to an imaging region having material comprising one or more scattering points at each of which one or more physical properties of the material are to be determined;
    measuring, at a plurality of receivers, electromagnetic radiation scattered by the one or more scattering points;
    for each scattering point, updating the measured radiation according to a respective sensitivity weight vector of that scattering point, the sensitivity weight vector designating for each source-receiver pair a relative importance indicative of sensitivity of the pair to a change in one or more material properties at the scattering point; and
    computing the one or more physical properties at each scattering point using the updated radiation measurement.

2. The method of claim 1, wherein computing the one or more physical properties at a particular scattering point comprises:
    computing forward electromagnetic fields by applying a forward Maxwell operator to a dipole moment of each source;
    computing backprojected electromagnetic fields by applying an adjoint operator to the updated radiation measurement; and
    computing an adjoint of a linearized residual operator using the forward and backprojected electromagnetic fields.

3. The method of claim 1, wherein the sensitivity weight vector for a particular scattering point is based on one or more sensitivity parameters, wherein a particular sensitivity parameter represents, for a particular source-receiver pair, a magnitude of change in one dimension of a three-dimensional space in electric or magnetic field measured at the particular receiver in response to change in a property of material at the scattering point in the same or another dimension of the three-dimensional space.

4. The method of claim 3, further comprising determining the sensitivity weight vector of a scattering point, the determination of the sensitivity weight vector comprising:
    determining a first plurality of sensitivity parameters for the scattering point;
    determining a second plurality of sensitivity parameters for one or more different scattering points; and
    computing a sensitivity weight vector that maximizes a ratio of a first norm based on the first plurality of sensitivity parameters and a second norm based on the second plurality of sensitivity parameters.

5. The method of claim 4, computing a particular sensitivity parameter for a particular scattering point comprises:
    computing forward electromagnetic fields by applying a forward Maxwell operator to a dipole moment of each source of the plurality of sources;
    computing backprojected electromagnetic fields by applying an adjoint operator to the forward electromagnetic fields; and
    computing the particular sensitivity parameter using the forward and backprojected electromagnetic fields.

6. The method of claim 1, wherein an electromagnetic radiation source in the plurality of sources is an electric dipole or a magnetic dipole.

7. The method of claim 1, wherein a wavelength of radiation from an electromagnetic radiation source in the plurality of sources is larger than a size of the imaging region.

8. The method of claim 7, wherein the electromagnetic radiation source is a piezoelectric resonator.

9. The method of claim 1, wherein a physical property of the material comprises one or more of permittivity, conductivity, or permeability.

10. The method of claim 1, wherein the material is inhomogeneous.

11. A system for determining one or more physical properties of material, the system comprising:
    a first processor; and
    a first memory in electrical communication with the first processor, and comprising instructions that, when executed by a processing unit that comprises the first processor or a second processor, and that is in electronic communication with a memory module that comprises the first memory or a second memory, program the processing unit to:

receive from a subsystem comprising a plurality of electromagnetic radiation sources and a plurality of receivers, wherein the plurality of sources is configured for directing electromagnetic radiation to an imaging region having material comprising one or more scattering points at each of which one or more physical properties of the material are to be determined, electromagnetic radiation scattered by the one or more scattering points;

for each scattering point, update the measured radiation according to a respective sensitivity weight vector of that scattering point, the sensitivity weight vector designating for each source-receiver pair a relative importance indicative of sensitivity of the pair to a change in one or more material properties at the scattering point; and compute the one or more physical properties at each scattering point using the updated radiation measurement.

12. The system of claim 11, wherein to compute the one or more physical properties at a particular scattering point, the instructions program the processing unit to:

compute forward electromagnetic fields by applying a forward Maxwell operator to a dipole moment of each source;

compute backprojected electromagnetic fields by applying an adjoint operator to the updated radiation measurement; and compute an adjoint of a linearized residual operator using the forward and backprojected electromagnetic fields.

13. The system of claim 11, wherein the sensitivity weight vector for a particular scattering point is based on one or more sensitivity parameters, wherein a particular sensitivity parameter represents, for a particular source-receiver pair, a magnitude of change in one dimension of a three-dimensional space in electric or magnetic field measured at the particular receiver in response to change in a property of material at the scattering point in the same or another dimension of the three-dimensional space.

14. The system of claim 13, wherein to determine the sensitivity weight vector of a scattering point, the instructions program the processing unit to:

determine a first plurality of sensitivity parameters for the scattering point;

determine a second plurality of sensitivity parameters for one or more different scattering points; and compute a sensitivity weight vector that maximizes a ratio of a first norm based on the first plurality of sensitivity parameters and a second norm based on the second plurality of sensitivity parameters.

15. The system of claim 14, wherein to compute a particular sensitivity parameter for a particular scattering point the instructions program the processing unit to:

compute forward electromagnetic fields by applying a forward Maxwell operator to a dipole moment of each source of the plurality of sources;

compute backprojected electromagnetic fields by applying an adjoint operator to the forward electromagnetic fields; and compute the particular sensitivity parameter using the forward and backprojected electromagnetic fields.

16. The system of claim 11, further comprising:

the subsystem comprising the plurality of electromagnetic radiation sources and the plurality of receivers.

17. The method of claim 16, wherein an electromagnetic source in the plurality of sources is a piezoelectric resonator.

18. The system of claim 16, wherein an electromagnetic source in the plurality of sources is an electric dipole or a magnetic dipole.

19. The system of claim 11, wherein a wavelength of radiation from an electromagnetic radiation source in the plurality of sources is larger than a size of the imaging region.

20. The system of claim 11, wherein a physical property of the material comprises one or more of permittivity, conductivity, or permeability.

21. The system of claim 11, wherein the material is inhomogeneous.

* * * * *